(12) United States Patent
Furihata et al.

(10) Patent No.: US 10,657,412 B2
(45) Date of Patent: *May 19, 2020

(54) CALCULATION OF DEGREE OF SIMILARITY BETWEEN TWO IMAGES

(71) Applicant: Synaptics Japan GK, Nakano, Tokyo (JP)

(72) Inventors: Hirobumi Furihata, Tokyo (JP); Masao Orio, Tokyo (JP); Susumu Saito, Tokyo (JP); Takashi Nose, Tokyo (JP); Akio Sugiyama, Tokyo (JP)

(73) Assignee: Synaptics Japan GK, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/355,100

(22) Filed: Mar. 15, 2019

(65) Prior Publication Data

US 2019/0213440 A1   Jul. 11, 2019

Related U.S. Application Data

(63) Continuation of application No. 15/483,315, filed on Apr. 10, 2017, now Pat. No. 10,235,598.

(30) Foreign Application Priority Data

Apr. 12, 2016   (JP) .................................. 2016-079745

(51) Int. Cl.
  *G06K 9/62*  (2006.01)
  *G06F 16/583*  (2019.01)
  (Continued)

(52) U.S. Cl.
  CPC ....... *G06K 9/6215* (2013.01); *G06F 16/5838* (2019.01); *G06K 9/4652* (2013.01);
  (Continued)

(58) Field of Classification Search
  None
  See application file for complete search history.

(56) References Cited

U.S. PATENT DOCUMENTS

| 5,640,200 A | * | 6/1997 | Michael | ................ G06T 7/001 348/126 |
| 2001/0045979 A1 | | 11/2001 | Matsumoto et al. | |
| 2013/0223750 A1 | | 8/2013 | Xiong et al. | |

FOREIGN PATENT DOCUMENTS

| JP | H9200750 A | 7/1977 |
| JP | H5155072 A | 6/1993 |
| JP | H7231391 A | 8/1995 |

* cited by examiner

*Primary Examiner* — Yingchun He
(74) *Attorney, Agent, or Firm* — Patterson + Sheridan, LLP

(57) ABSTRACT

An image processing apparatus includes: a first circuit which calculates values $f(R_{Pi})$, $f(G_{Pi})$ and $f(B_{Pi})$ by applying a function $f(x)$ to an R grayscale value $R_{Pi}$, a G grayscale value $G_{Pi}$ and a B grayscale value $B_{Pi}$ of each pixel i of a first image; a second circuit which calculates values $f(R_{Qi})$, $f(G_{Qi})$ and $f(B_{Qi})$ by applying the function $f(x)$ to an R grayscale value $R_{Qi}$, a G grayscale value $G_{Qi}$ and a B grayscale value $B_{Qi}$ of each pixel i of a second image; and a similarity calculation circuit which calculates a degree of similarity between the first and second images depending on $|f(R_{Pi})-f(R_{Qi})|$, $|f(G_{Pi})-f(G_{Qi})|$ and $|f(B_{Pi})-f(B_{Qi})|$ associated with each pixel i of the first and second images. The function $f(x)$ is a convex function monotonically non-decreasing in the domain of definition.

20 Claims, 11 Drawing Sheets

(51) Int. Cl.
*G06T 1/00* (2006.01)
*G09G 5/00* (2006.01)
*G06K 9/46* (2006.01)
*G09G 3/20* (2006.01)

(52) U.S. Cl.
CPC .............. *G06K 9/6212* (2013.01); *G06T 1/00* (2013.01); *G09G 5/003* (2013.01); *G09G 2310/027* (2013.01); *G09G 2320/106* (2013.01); *G09G 2340/02* (2013.01); *G09G 2350/00* (2013.01)

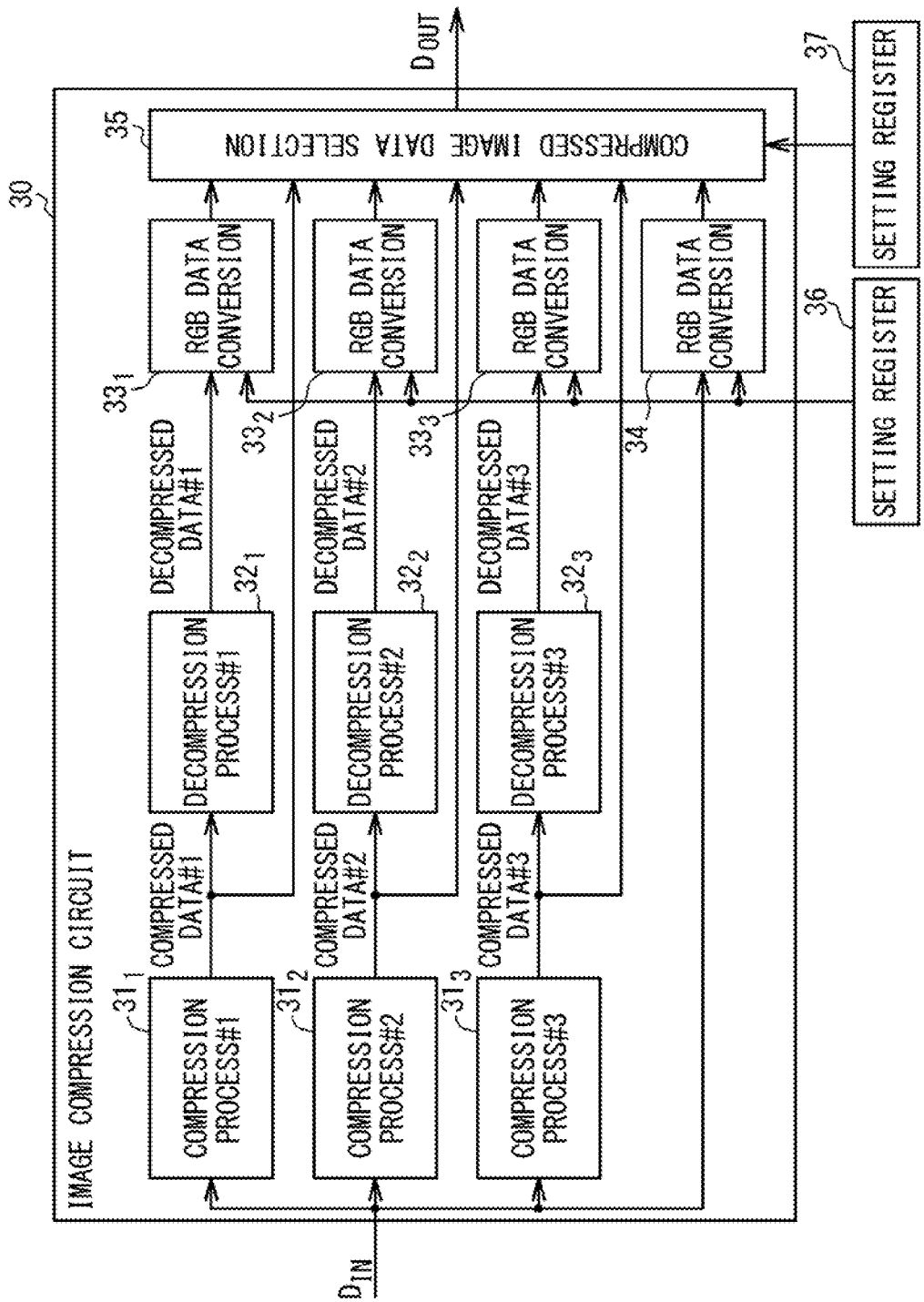

Fig. 11
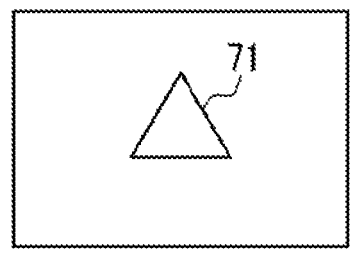
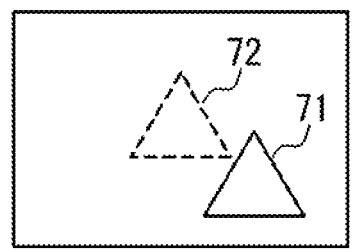
Fig. 12
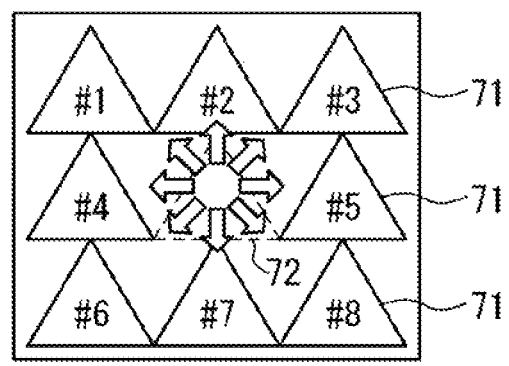

CALCULATION OF DEGREE OF SIMILARITY BETWEEN TWO IMAGES

CROSS REFERENCE

This application is a continuation of co-pending U.S. patent application Ser. No. 15/483,315, filed on Apr. 10, 2017, which claims priority to Japanese Patent Application No. 2016-079745, filed on Apr. 12, 2016. Each of these patent applications is incorporated herein by reference in its entirety.

TECHNICAL FIELD

The present disclosure relates to a device and method for image processing, more particularly, to a technique for calculating the degree of similarity between images (or image data).

BACKGROUND ART

Image comparison is one of the most basic image processing techniques. For example, template matching which calculates the degree of similarity (or likelihood) between a target image and a template image is widely used in image recognition. Also, image compression of still images or video images often includes processing based on the degree of similarity (or degree of difference) between two images.

The degree of similarity between two images (or degree of difference between image data of two images) is most typically evaluated with a SAD (sum of absolute differences) or a SSD (sum of squared differences) of grayscale values or brightness values. For example, when two images P and Q are compared on the basis of the brightness value (Y data in the YUV format, for example) of each pixel i of images P and Q, the degree of similarity S may be calculated by the following expression (1):

$$S = \sum_i |Y_{Pi} - Y_{Qi}|, \quad (1)$$

where $Y_{Pi}$ and $Y_{Qi}$ are the brightness values of pixels i of images P and Q, respectively, and $\Sigma$ represents the sum with respect to all the pixels of images P and Q. When the image data of each pixel i is given in the RGB format, the brightness values $Y_{Pi}$ and $Y_{Qi}$ of pixels i of images P and Q in expression (1) may be calculated in accordance with the following expressions (2a) and (2b), for example:

$$Y_{Pi} = 0.300 R_{Pi} + 0.590 G_{Pi} + 0.110 B_{Pi}, \quad (2a)$$

$$Y_{Qi} = 0.300 R_{Qi} + 0.590 G_{Qi} + 0.110 B_{Qi}, \quad (2b)$$

where $R_{Pi}$, $G_{Pi}$ and $B_{Pi}$ are the grayscale values of the red (R), green (G) and blue (B) colors, respectively, which are indicated in the image data of image P and $R_{Qi}$, $G_{Qi}$ and $B_{Qi}$ are the grayscale values of the red, green and blue colors, respectively, which are indicated in the image data of image Q. It should be noted that various expressions may be used for conversion from RGB data to Y data as is well known in the art.

However, the degree of similarity of two images calculated on the basis of the SAD or SSD of the grayscale values of respective colors of the respective pixels or the brightness values of the respective pixels is not a parameter optimized for representing the difference between two images actually displayed on a display device (or the difference between two images actually perceived by an observer observing the display device).

In connection with this, Japanese Patent Application No. H07-231391 A discloses a technology in which a compression process selected in response to an attribute data is performed in compressing image data described with a page description language.

Japanese Patent Application Publication No. H09-200750 A discloses a block compression processing based on curved surface fitting, in which parameters of the curved surface fitting are determined on the basis of the sum of squares of compression errors.

Japanese Patent Application No. H05-155072 A discloses a technique which involves compressing a bitmap data received from a host device with a plurality of different compression schemes and selecting the one that most reduces the data amount.

SUMMARY OF DISCLOSURE

Therefore, one objective of the present disclosure is to provide a technique which achieves image processing on the basis of the difference between images actually displayed on a display device (or the difference between images actually perceived by an observer observing the display device). Other objectives and new features of the present disclosure would be understood by a person skilled in the art from the following description.

In one embodiment, an image processing apparatus includes: a first circuit which calculates values $f(R_{Pi})$, $f(G_{Pi})$ and $f(B_{Pi})$ by applying a function $f(x)$ to an R grayscale value $R_{Pi}$, a G grayscale value $G_{Pi}$ and a B grayscale value $B_{Pi}$ of each pixel i of a first image; a second circuit which calculates values $f(R_{Qi})$, $f(G_{Qi})$ and $f(B_{Qi})$ by applying the function $f(x)$ to an R grayscale value $R_{Qi}$, a G grayscale value $G_{Qi}$ and a B grayscale value $B_{Qi}$ of each pixel i of a second image; and a similarity calculation circuit which calculates a degree of similarity between the first and second images depending on $|f(R_{Pi})-f(R_{Qi})|$, $|f(G_{Pi})-f(G_{Qi})|$ and $|f(B_{Pi})-f(B_{Qi})|$ associated with each pixel i of the first and second images. The lower limit of the domain of definition of the function $f(x)$ is the allowed minimum value of the R grayscale values $R_{Pi}$, $R_{Qi}$, the G grayscale values $G_{Pi}$, $G_{Qi}$ and the B grayscale values $B_{Pi}$, $B_{Qi}$, and the upper limit of the same is the allowed maximum value of the R grayscale values $R_{Pi}$, $R_{Qi}$, the G grayscale values $G_{Pi}$, $G_{Qi}$ and the B grayscale values $B_{Pi}$, $B_{Qi}$. The function $f(x)$ is a convex function monotonically non-decreasing in the domain of definition.

In another embodiment, an image compression circuit includes: a compression circuitry generating first to $N^{th}$ compressed data by respectively performing first to $N^{th}$ compression processes on an original image data, for N being an integer of two or more; a decompression circuitry generating first to $N^{th}$ decompressed data by respectively performing corresponding decompression processes on the first to $N^{th}$ compressed data; first to $(N+1)^{th}$ grayscale data conversion circuits; and a compressed image data selection circuit selecting an output compressed image data from among the first to $N^{th}$ compressed data and outputting the output compressed image data. The $k^{th}$ grayscale data conversion circuit of the first to $N^{th}$ grayscale data conversion circuit is configured to calculate values $f(R_{ki})$, $f(G_{ki})$ and $f(B_{ki})$ by respectively applying a function $f(x)$ to an R grayscale value $R_{ki}$, a G grayscale value $G_{ki}$ and a B grayscale value $B_{ki}$ of each pixel i of the $k^{th}$ decompressed data of the first to $N^{th}$ decompressed data, for k being any integer from one to N. The $(N+1)^{th}$ grayscale data conversion circuit is configured to calculate values $f(R_{INi})$, $f(G_{INi})$ and $f(B_{INi})$ by respectively applying the function $f(x)$ to an R grayscale value $R_{INi}$, a G grayscale value $G_{INi}$ and a B grayscale value $B_{INi}$ of each pixel i of the original image data. The compressed image data select circuit is configured to calculate degrees of similarity between the original image data and the first to $N^{th}$ decompressed data and select an output compressed image data from the first to $N^{th}$ compressed data in response to the calculated degrees of similarity. The degree of similarity between the $k^{th}$ decompressed data and the original image data is calculated depending on $|f(R_{ki})-f(R_{INi})|$, $|f(G_{ki})-f(G_{INi})|$ and $|f(B_{ki})-f(B_{INi})|$ associated with each pixel i of the $k^{th}$ decompressed data and the original image data. The lower limit of the domain of definition of the function $f(x)$ is the allowed minimum value of the R grayscale values $R_{ki}$, $R_{INi}$, the G grayscale values $G_{ki}$, $G_{INi}$ and the B grayscale values $B_{ki}$, $B_{INi}$, and the upper limit of the same is the allowed maximum value of the R grayscale values $R_{ki}$, $R_{INi}$, the G grayscale values $G_{ki}$, $G_{INi}$ and the B grayscale values $B_{ki}$, $B_{INi}$. The function $f(x)$ is a convex function monotonically non-decreasing in the domain of definition.

The image compression circuit thus configured may be used in a display driver which drives a display panel or in a display device.

In still another embodiment, an image processing method includes: calculating values $f(R_{Pi})$, $f(G_{Pi})$ and $f(B_{Pi})$ by applying a function $f(x)$ to an R grayscale value $R_{Pi}$, a G grayscale value $G_{Pi}$ and a B grayscale value $B_{Pi}$ of each pixel i of a first image; calculating values $f(R_{Qi})$, $f(G_{Qi})$ and $f(B_{Qi})$ by applying the function $f(x)$ to an R grayscale value $R_{Qi}$, a G grayscale value $G_{Qi}$ and a B grayscale value $B_{Qi}$ of each pixel i of a second image; and calculating a degree of similarity between the first and second images depending on $|f(R_{Pi})-f(R_{Qi})|$, $|f(G_{Pi})-f(G_{Qi})|$ and $f(B_{Pi})-f(B_{Qi})|$ associated with each pixel i of the first and second images. The lower limit of the domain of definition of the function $f(x)$ is the allowed minimum value of the R grayscale values $R_{Pi}$, $R_{Qi}$, the G grayscale values $G_{Pi}$, $G_{Qi}$ and the B grayscale values $B_{Pi}$, $B_{Qi}$, and the upper limit of the same is the allowed maximum value of the R grayscale values $R_{Pi}$, $R_{Qi}$, the G grayscale values $G_{Pi}$, $G_{Qi}$ and the B grayscale values $B_{Pi}$, $B_{Qi}$. The function $f(x)$ is a convex function monotonically non-decreasing in the domain of definition.

The present disclosure provides a technique which achieves image processing on the basis of the difference between images actually displayed on a display device (or the difference between images actually perceived by an observer observing the display device).

BRIEF DESCRIPTION OF THE DRAWINGS

FIG. 1 schematically illustrates a reference image and images #1 and #2 to be compared with;

FIG. 2 is a graph illustrating the relation between the grayscale value of each color indicated by the image data and the actual brightness level of the corresponding subpixel in a display device;

FIG. 8 is a block diagram illustrating the configuration of an image compression circuit in one embodiment;

FIG. 11 is a diagram illustrating detection of a motion vector in one embodiment; and FIG. 12 is a diagram illustrating the definition of movement directions #1 to #8 and movement amounts #1 to #8 in the present embodiment.

DETAILED DESCRIPTION OF PREFERRED EMBODIMENTS

Figures 1, 2:
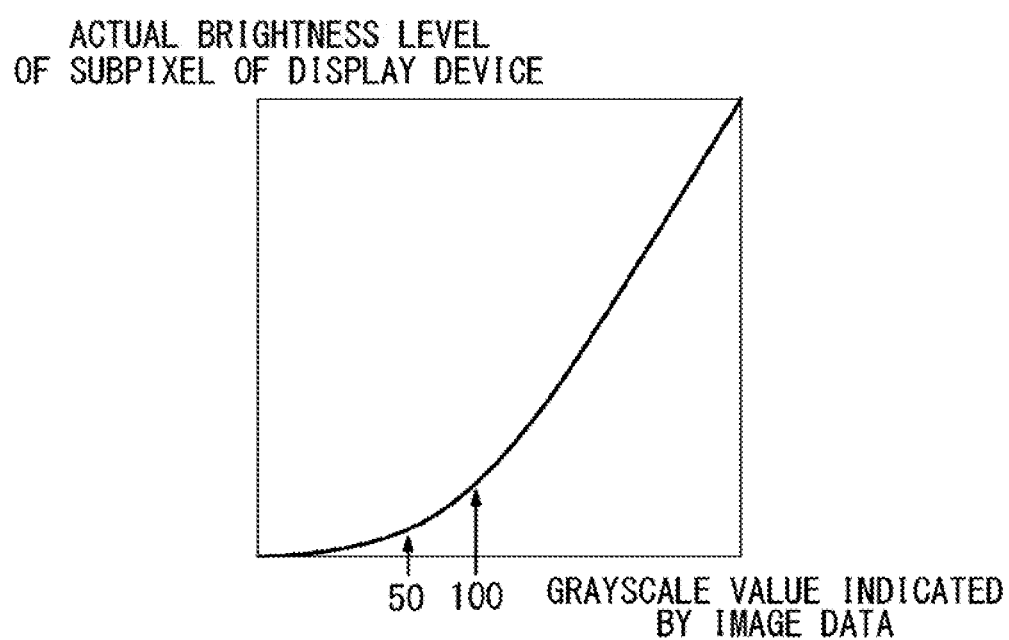

The present disclosure will be now described herein with reference to illustrative embodiments. Those skilled in the art would recognize that many alternative embodiments can be accomplished using the teachings of the present disclosure. In the following, same or similar elements may be denoted by same or corresponding reference numerals and suffixes may be attached to reference numerals to distinguish the same elements from each other.

For ease of understanding of a technical idea given in the present disclosure, a description is first given of a problem which occurs in a technique in which the degree of similarity (or degree of difference) between two images is represented with the SAD (sum of absolute differences) or SSD (sum of squared differences) of the grayscale value of each color of each pixel or the brightness value of each pixel.

As described above, the degree of similarity between two images (or degree of similarity between image data of two images) is most typically calculated on the basis of the SAD or SSD of the grayscale value of each color of each pixel or the brightness value of each pixel. When image data of a reference image and images #1 and #2 to be compared with are described in the RGB format, for example, the degree of similarity $S_1$ between the reference image and image #1 and the degree of similarity $S_2$ between the reference image and image #2 can be most simply calculated with the following expressions (3a) and (3b) based on the SADs:

$$S_1 = \sum_i \{|R_{1i} - R_{REFi}| + |G_{1i} - G_{REFi}| + |B_{1i} - B_{REFi}|\}, \quad (3a)$$

$$S_2 = \sum_i \{|R_{2i} - R_{REFi}| + |G_{2i} - G_{REFi}| + |B_{2i} - B_{REFi}|\}, \quad (3b)$$

where $R_{1i}$, $G_{1i}$ and $B_{1i}$ are respectively the R grayscale value, G grayscale value and B grayscale value (that is, the grayscale values of the red, green and blue colors) of pixel i described in the image data of image #1 to be compared with, and $R_{2i}$, $G_{2i}$ and $B_{2i}$ are respectively the R grayscale value, G grayscale value and B grayscale value of pixel i described in the image data of image #2 to be compared with, while $R_{REFi}$, $G_{REFi}$ and $B_{REFi}$ are respectively the R grayscale value, G grayscale value and B grayscale value of pixel i described in the image data of the reference image; Σ represents the sum with respect to all the pixels.

When two images to be compared with each other are actually displayed on a specific display device, the degree of difference between the two images actually displayed on the display device or the degree of difference between the two images actually perceived by an observer of the display device is not properly represented by the sum of absolute differences or the sum of squared differences.

Discussed below is one example in which the image data of images #1 and #2 are compared with the image data of the reference image as illustrated in FIG. 1. For simplicity of the discussion, the discussion is given in an assumption that images #1 and #2 and the reference image each have four pixels and the R, G and B grayscale values are equal to each other for each of the four pixels and the R, G and B grayscale values of the four pixels are as illustrated in FIG. 1. For example, the R, G and B grayscale values of the left top pixel of the reference image are defined as 100 in the image data of the reference image.

With respect to images #1, #2 and the reference image illustrated in FIG. 1, when the degree of similarity $S_1$ between image #1 and the reference image and the degree of similarity $S_2$ between image #2 and the reference image are calculated in accordance with expressions (3a) and (3b), the degrees of similarity $S_1$ and $S_2$ are obtained as follows:

$S_1 = |100-99|+|100-99|+|100-99|+|50-50|+|50-50|+|50-50|+|50-50|+|50-50|+|50-50|+|100-100|+|100-100|+|100-100|=3$, and $S_2 = |100-100|+|100-100|+|100-100|+|50-49|+|50-49|+|50-49|+|50-50|+|50-50|+|50-50|+|100-100|+|100-100|+|100-100|=3$.

This means that the degrees of similarity $S_1$ and $S_2$ calculated in accordance with expressions (3a) and (3b) are equal to each other.

When images #1, #2 and the reference images are actually displayed on a display device, however, an observer of the display device perceives that the difference between image #1 and the reference image is larger than that between image #2 and the reference image. This implies that the degree of similarity (or degree of difference) calculated on the basis of the SAD of the grayscale value of each color of each pixel does not perfectly reflect the degree of similarity (or degree of difference) perceived by the observer of the display device. This discussion also applies to the case when the degree of similarity is calculated on the SSD of the grayscale value of each color of each pixel and the case when the degree of similarity is calculated on the SAD or SSD of the brightness value (Y data) of each pixel.

One cause of this phenomenon is that the input-output property of the display device (which may be referred to as the gamma characteristics in general) is ignored in the scheme of evaluating the degree of similarity on the basis of the SAD or SSD of the grayscale value of each color of each pixel or the brightness value of each pixel.

FIG. 2 is a graph illustrating one example of the input-output property of a display device. In general, the input-output property of a display device is non-linear. Most typically, when a grayscale value of a specific color (for example, the red, green or blue color) of a specific pixel is described in an input image data, the brightness level of the subpixel of the specific color of the specific pixel is proportional to the $\gamma^{th}$ power of the grayscale value in the display screen of the display device, where γ is a parameter called "gamma value"; the gamma value γ is usually set to 2.2 for a panel display device such as a liquid crystal display device and an OLED (organic light emitting diode) display device.

Due to the non-linear input-output property of a display device, even when the SADs or SSDs of the grayscale value of each color of each pixel described in image data are same, the difference in the actual brightness level between subpixels for which the grayscale values described in the image data are in a relatively large range is larger than that between subpixels for which the grayscale values described in the image data are in a relatively small range. In the example illustrated in FIG. 1, the grayscale values of the corresponding subpixels of the upper left pixels of image #1 and the reference image are in the range near 100, while the grayscale values of the corresponding subpixels of the upper right pixels of image #2 and the reference image are in the range near 50. In this case, the difference of "1" in the grayscale value in the range near 100 between image #1 and the reference image causes a larger influence on the brightness levels of the pixels actually displayed on the display device, than the difference of "1" in the grayscale value in the range near 50 between image #2 and the reference image. The scheme of evaluating the degree of similarity (or degree of difference) on the basis of the SAD or SSD of the grayscale value of each color of each pixel or the brightness value of each pixel cannot properly evaluate such difference in the brightness level. In embodiments described in the following, a technique is presented which allows appropriately calculating the degree of similarity (or degree of difference) in view of the non-linear input-output property of a display device.

In one embodiment, when image data of two images P and Q are given in the RGB format, the degree of similarity S between images P and Q (or the degree of similarity S between image data of the two images P and Q) is calculated in accordance with the following expression (4):

$$S = \sum_i g(|f(R_{Pi}) - f(R_{Qi})|, |f(G_{Pi}) - f(G_{Qi})|, |f(B_{Pi}) - f(B_{Qi})|), \quad (4)$$

where $R_{Pi}$, $G_{Pi}$ and $B_{Pi}$ are respectively the R grayscale value, G grayscale value and B grayscale value of pixel i described in the image data of image P, and where $R_{Qi}$, $G_{Qi}$ and $B_{Qi}$ are respectively the R grayscale value, G grayscale value and B grayscale value of pixel i described in the image data of image Q. Note that Σ represents the sum with respect to all the pixels of images P and Q.

In the following description, the R, G and B grayscale values are represented with integers equal to or more than zero in the image data of images P and Q. It should be noted that R, G and B grayscale values can be represented with integers equal to or more than zero without loss of generality, because R, G and B grayscale values are generally represented in the binary notation in handing image data in processors or other semiconductor devices.

In expression (4), f(x) is a convex function monotonically non-decreasing in the domain of definition, where the lower limit of the domain of definition is the allowed minimum value of the grayscale values (R, G and B grayscale values) of the respective pixels in the image data and the upper limit of the domain of definition is the allowed maximum value of the grayscale values. The convex function may be also referred to as the downward-convex function. When the R, G and B grayscale values are each represented with eight bits in an image data, the allowed minimum value of the R, G and B grayscale values is zero and the allowed maximum value is 255. In this case, the lower limit of the domain of definition of the function f(x) is zero and the upper limit of the same is 255. The function f(x) may be a convex function monotonically increasing in the domain of definition.

It should be noted that the function f(x) is a non-linear function, since the function f(x) is a convex function (or downward-convex function). It should be also noted that the function f(x) is not a constant function, since the function f(x) is a monotonically non-decreasing convex function.

Furthermore, the function g(x, y, z) is a function which depends on all of x, y and z, and is not a constant function. In other words, expressions (4), which calculates the degree of similarity S with the function g(x, y, z), means that the degree of similarity S between images P and Q is calculated depending on three absolute differences $|f(R_{Pi})-f(R_{Qi})|$, $|f(G_{Pi})-f(G_{Qi})|$ and $|f(B_{Pi})-f(B_{Qi})|$. The degree of similarity S between images P and Q calculated in accordance with expression (4) is more appropriate in view of the non-linear input-output property of the display device, compared with the degree of similarity calculated depending on the absolute differences of the R, G and B grayscale values $|R_{Pi}-R_{Qi}|$, $|G_{Pi}-G_{Qi}|$ and $|B_{Pi}-B_{Qi}|$.

In an actual implementation, the calculations of the functions f(x) and g(x, y, z) may be achieved with any technical means. For example, the calculations of the functions f(x) and g(x, y, z) may be implemented with a hardware circuit dedicated for the calculations of the functions f(x) and g(x, y, z), or implemented with lookup tables. Alternatively, the calculations of the functions f(x) and g(x, y, z) may be implemented with software.

In a preferred embodiment, the degree of similarity S of images P and Q may be calculated in accordance with the following expression (5):

$$S = \sum_i \{K_R|f(R_{Pi}) - f(R_{Qi})|^P + K_G|f(G_{Pi}) - f(G_{Qi})|^P + K_B|f(B_{Pi}) - f(B_{Qi})|^P\}, \quad (5)$$

where p is a non-zero number and $K_R$, $K_G$ and $K_B$ are weighting factors defined for the red, green and blue colors, respectively, in the calculation of the degree of similarity S. It should be noted that, in a terminology "calculate in accordance with a certain expression", the term "in accordance with" means to include not only the calculation using the certain expression itself but also a calculation using an expression equivalent to the certain expression. For example, an expression obtained from a specific expression simply through a mathematical deformation is equivalent to the specific expression. When the weighting factors $K_R$, $K_G$ and $K_B$ are positive numbers, expression (5) can be rewritten as $$S = \sum_i \{|K_R \cdot f(R_{Pi}) - K_R \cdot f(R_{Qi})|^P + |K_G \cdot f(G_{Pi}) - K_G \cdot f(G_{Qi})|^P + |K_B \cdot f(B_{Pi}) - K_B \cdot f(B_{Qi})|^P\} \quad (5')$$

In this case, it would be easily understood by a person skilled in the art that expressions (5) and (5') are mathematically equivalent.

The weighting factors $K_R$, $K_G$ and $K_B$ may be one. In this case, expression (5) may be rewritten as follows:

$$S = \sum_i \{|f(R_{Pi}) - f(R_{Qi})|^P + |f(G_{Pi}) - f(G_{Qi})|^P + |f(B_{Pi}) - f(B_{Qi})|^P\} \quad (6)$$

In view of easiness of the calculation of the degree of similarity S, it is preferable that p=1. In other words, it is preferable that the degree of similarity S is calculated in accordance with the following expression (7):

$$S = \sum_i \{K_R|f(R_{Pi}) - f(R_{Qi})| + K_G|f(G_{Pi}) - f(G_{Qi})| + K_B|f(B_{Pi}) - f(B_{Qi})|\}, \quad (7)$$

As described above, a display device typically has an input-output property in which the brightness level of the subpixel of a specific color of a specific pixel in the display screen of a display device is proportional to the $\gamma^{th}$ power of the grayscale value of the specific color of the specific pixel indicated in the image data, where $\gamma$ is the gamma value of the display device. In this aspect, it is preferable that the function f(x) is defined as a function which depends on a constant power of x. For example, it is preferable that the function f(x) is defines as follows:

$$f(x)=x\hat{\ }a,$$

where the operator "^" represents a power operator and a is a constant more than one.

Especially, when the gamma value of the display device is $\gamma$, it is preferable that the function f(x) used to calculate the degree of similarity between images associated with image data used in the display device is a function that depends on the $\gamma^{th}$ power of x, for $\gamma \neq 1$. For example, it is preferable that the degree of similarity S between images P and Q is calculated in accordance with the following expression (8):

$$S = \sum_i \{K_R|R_{Pi}^\gamma - R_{Qi}^\gamma| + K_G|G_{Pi}^\gamma - G_{Qi}^\gamma| + K_B|B_{Pi}^\gamma - B_{Qi}^\gamma|\} \quad (8)$$

It should be noted that expression (8) can be obtained by defining the function f(x) as follows in expression (7):

$$f(x)=x\hat{\ }\gamma.$$

Since the gamma value $\gamma$ is generally set to 2.2 in a display device (e.g., a liquid crystal display device and OLED display device), it is preferable that the degree of similarity S between images P and Q is calculated in accordance with the following expression (9):

$$S = \sum_i \{K_R|R_{Pi}^{2.2} - R_{Qi}^{2.2}| + K_G|G_{Pi}^{2.2} - G_{Qi}^{2.2}| + K_B|B_{Pi}^{2.2} - B_{Qi}^{2.2}|\} \quad (9)$$

As described above, defining the function f(x) as a function depending on a constant power of x, for example as in the case when the degree of similarity S is calculated in accordance with expression (8) or (9), is preferable for evaluating the degree of difference between two images actually displayed on a display device from the image data associated with the two images; however, defining the function f(x) as a function depending on a constant power of x may cause a problem of an undesired increase in the circuit size in an implementation in an actual device, because the circuit size of a hardware circuit which strictly performs a power operation is large.

Figure 3:
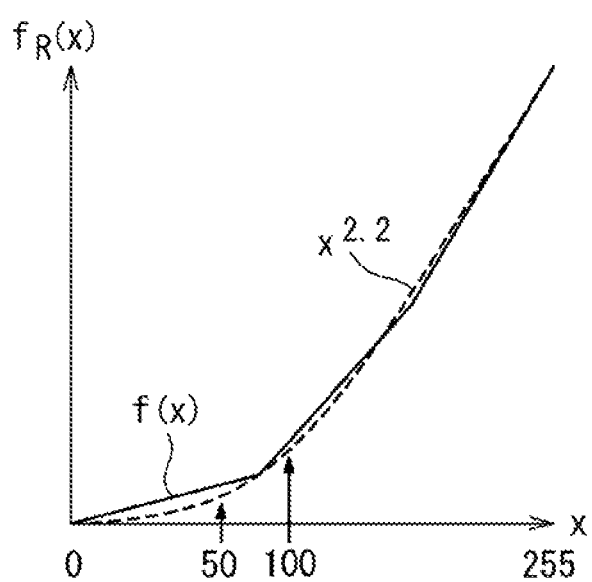
FIG. 3 is a graph illustrating one example of a polygonal line function which approximates $x^{2.2}$.

To address this problem, it is preferable to define the function f(x) as a polygonal line function or polynomial function which approximates a constant power of x. The polygonal line function referred to herein is a continuous function the graph of which consists of line segments. FIG. 3 illustrates one example of f(x) defined as a polygonal line function which approximates a constant power of x. Illustrated in the example of FIG. 3 is the function f(x) which is defined a continuous function the graph of which consists of three line segments. Since the size of a hardware circuit which calculates a polygonal line function or polynomial function can be significantly reduced compared with that of a hardware circuit which strictly calculates a power function, defining the function f(x) as a polygonal line function or polynomial function which approximates a constant power of x is effective for reducing the circuit size.

Especially, when the gamma value of the display device is γ, it is preferable to define the function f(x) as a polygonal line function or polynomial function which approximates $x^\gamma$. For example, when the gamma value of the display device is 2.2, it is preferable to define the function f(x) as a polygonal line function or polynomial function which approximates $x^{2.2}$.

The weighting factors $K_R$, $K_G$ and $K_B$ used in expressions (5) to (10) are respectively used to adjust the influences of the grayscale values of the red, green and blue colors on the degree of similarity S. In one embodiment, the weighting factors $K_R$, $K_G$ and $K_B$ may be set on the basis of the characteristics of the display device, for example, the color gamut of the display panel included in the display device. This allows calculating the degree of similarity S which more reflects the degree of difference between images actually displayed on the display device.

Figure 4A:
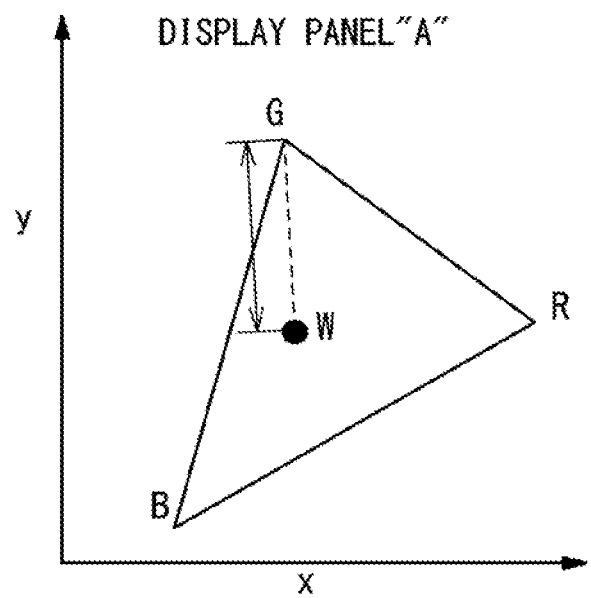
FIG. 4A is a diagram schematically illustrating the color gamut of display panel "A"
Figure 4B:
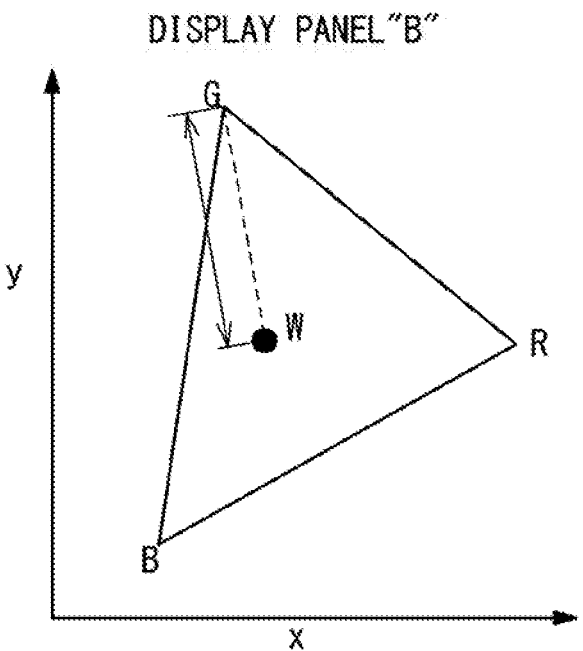
FIG. 4B is a diagram schematically illustrating the color gamut of display panel "B"

Discussed below is one example in which display devices respectively include display panels "A" and "B" which have the color gamut illustrated in FIGS. 4A and 4B, respectively. As understood from FIGS. 4A and 4B, the color gamut of display panel "B" is wider in the green (G) region, compared with display panel "A". In this case, the displayable brightness level of green of display panel "B" is higher than that of display panel "A". Accordingly, it is preferable to increase the weighting factor $K_G$ when the degree of similarity S is calculated with respect to the display device including display panel "B", compared with the case when the degree of similarity S is calculated with respect to the display device including display panel "A". The same discussion applies to other colors (the red and blue colors).

Figure 5:
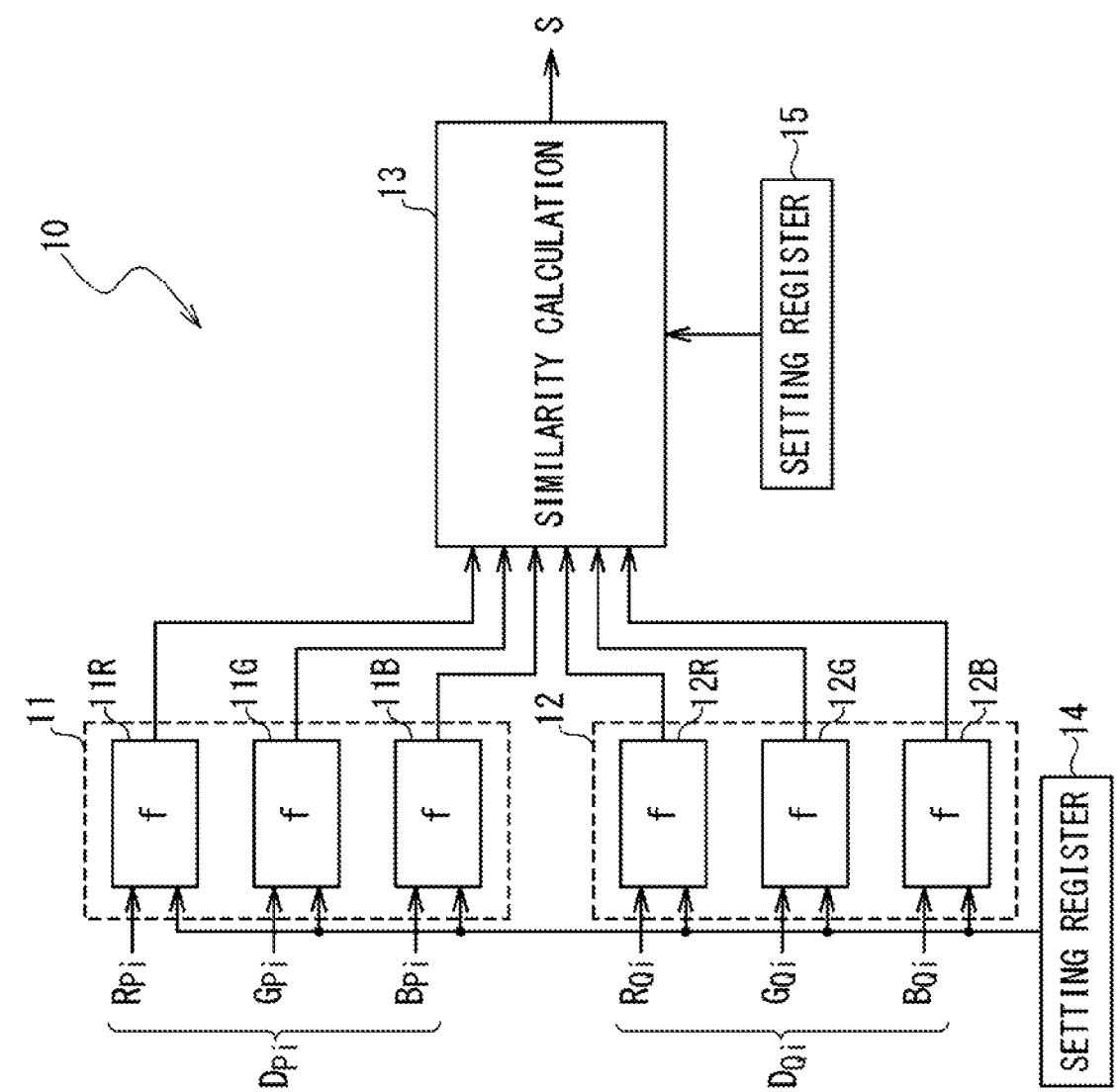
FIG. 5 is a block diagram illustrating the configuration of an image processing apparatus in one embodiment.

The above-described calculation of the degree of similarity S between two images may be implemented with a hardware circuit. FIG. 5 is a block diagram illustrating one example of the configuration of an image processing apparatus 10 which calculates the degree of similarity S between images P and Q with a hardware circuit.

The image processing apparatus 10 is configured to calculate the degree of similarity S between images P and Q which are given in the RGB format. In FIG. 5, image data of pixel i of image P is denoted by the legend "$D_{Pi}$" and image data of pixel i of image Q is denoted by the legend "$D_{Qi}$". The image data $D_R$ of pixel i of image P includes an R grayscale value $R_{Pi}$, a G grayscale value $G_{Pi}$ and a B grayscale value $B_{Pi}$. Correspondingly, the image data $D_{Qi}$ of pixel i of image Q includes an R grayscale value $R_{Qi}$, a G grayscale value $G_{Qi}$ and a B grayscale value $B_{Qi}$.

The image processing apparatus 10 includes RGB grayscale data conversion circuits 11, 12, a similarity calculation circuit 13 and setting registers 14 and 15. The RGB grayscale data conversion circuit 11 includes an R conversion block 11R, a G conversion block 11G and a B conversion block 11B. The RGB grayscale data conversion circuit 11 is sequentially supplied with image data $D_{Pi}$ of respective pixels i of image P. The R conversion block 11R of the RGB grayscale data conversion circuit 11 includes a circuit which calculates the value $f(R_{Pi})$ by applying the above-described function f(x) to the R grayscale value $R_{Pi}$ of the image data $D_{Pi}$ of each pixel i of image P. Similarly, the G conversion block 11G includes a circuit which calculates the value $f(G_{Pi})$ by applying the above-described function f(x) to the G grayscale value $G_{Pi}$ of the image data $D_{Pi}$ of each pixel i of image P and the B conversion block 11B includes a circuit which calculates the value $f(B_{Pi})$ by applying the above-described function f(x) to the B grayscale value $B_{Pi}$ of the image data $D_{Pi}$ of each pixel i of image P.

Similarly, the RGB grayscale data conversion circuit 12 includes an R conversion block 12R, a G conversion block 12G and a B conversion block 12B. The RGB grayscale data conversion circuit 12 is sequentially supplied with image data $D_{Qi}$ of respective pixels i of image Q. The R conversion block 12R of the RGB grayscale data conversion circuit 12 includes a circuit which calculates the value $f(R_{Qi})$ by applying the above-described function f(x) to the R grayscale value $R_{Qi}$ of the image data $D_{Qi}$ of each pixel i of image Q. Similarly, the G conversion block 12G includes a circuit which calculates the value $f(G_{Qi})$ by applying the above-described function f(x) to the G grayscale value $G_{Qi}$ of the image data $D_{Qi}$ of each pixel i of image Q and the B conversion block 12B includes a circuit which calculates the value $f(B_{Qi})$ by applying the above-described function f(x) to the B grayscale value $B_{Qi}$ of the image data $D_{Qi}$ of each pixel i of image Q.

The similarity calculation circuit 13 calculates the degree of similarity S in accordance with a selected one of expressions (4) to (9) on the basis of the values $f(R_{Pi})$, $f(G_{Pi})$ and $f(B_{Pi})$ received from the RGB grayscale data conversion circuit 11 and the values $f(R_{Qi})$, $f(G_{Qi})$ and $f(B_{Qi})$ received from the RGB grayscale data conversion circuit 12, and outputs a data indicating the degree of similarity S.

The setting register 14 stores therein setting parameters specifying coefficients and/or constants included in the function f(x) used in the RGB grayscale data conversion circuits 11 and 12. It is possible to modify the function f(x) through modifying the setting parameters stored in the setting register 14. For example, when the function f(x) is defined with the following expression:

$$f(x)=x^\gamma,$$

a parameter specifying the value of γ may be stored in the setting register 14. When the function f(x) is a polygonal line function, setting parameters specifying coefficients of expressions which define the respective line segments that form the graph of the polygonal line function may be stored in the setting registers 14. When the function f(x) is represented as a polynomial expression of x, setting parameters specifying coefficients of respective terms of the polynomial expression may be stored in the setting registers 14.

The setting register 15 stores therein setting parameters specifying coefficients and/or constants included in the function g(x, y, z). It is possible to modify the function g(x, y, z) through modifying the setting parameters stored in the setting register 15. When the degree of similarity S is calculated in accordance with a selected one of expressions (5), (7), (8) and (9), for example, the setting register 15 may store therein the weighting factors $K_R$, $K_G$ and $K_B$. In this case, the degree of similarity S is calculated by using the weighting factors $K_R$, $K_G$ and $K_B$ stored in the setting register 15.

Figure 6:
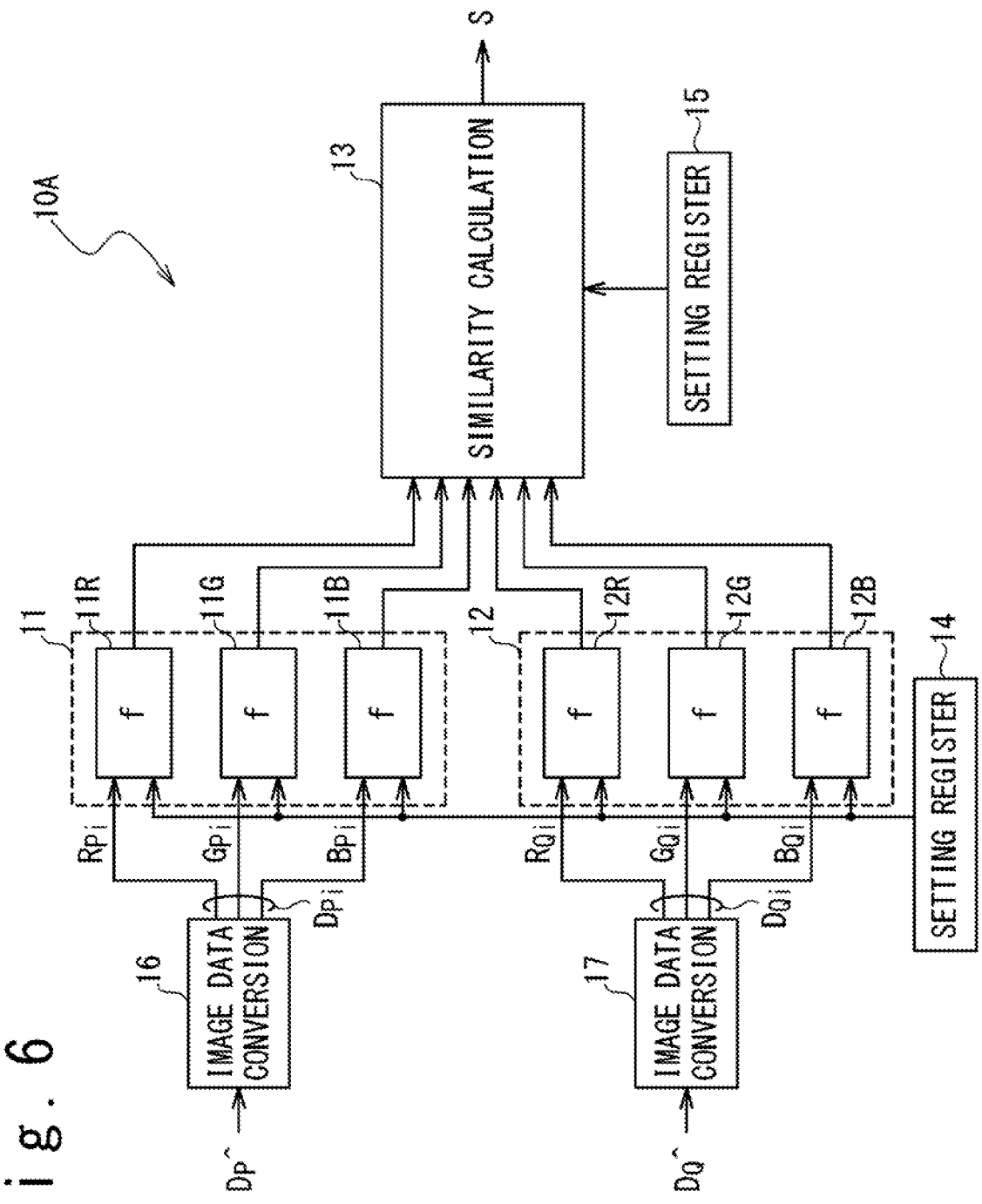
FIG. 6 is a block diagram illustrating the configuration of an image processing apparatus in another embodiment.

When the image data of images P and Q are given in a format different than the RGB format, the image data of images P and Q may be converted into image data in the RGB format and the degree of similarity S may be calculated from the image data in the RGB format obtained by this conversion. FIG. 6 is a block diagram illustrating an example of the configuration of an image processing apparatus 10A thus configured.

The image processing apparatus 10A illustrated in FIG. 6, which is configured similarly to the image processing apparatus 10 illustrated in FIG. 5, additionally includes image data conversion circuits 16 and 17. The image data conversion circuit 16 receives an image data $D_P\hat{}$ of image P described in a format different than the RGB format, and generates the image data $D_{Pi}$ of the RGB format for each pixel i of image P. Similarly, the image data conversion circuit 17 receives an image data $D_Q\hat{}$ of image Q described in a format different than the RGB format, and generates the image data $D_{Qi}$ of the RGB format for each pixel i of image Q. The operations of the RGB grayscale data conversion circuits 11, 12 and the similarity calculation circuit 13 are as described above. The similarity calculation circuit 13 outputs a data indicating the degree of similarity S between images P and Q.

Figure 7:
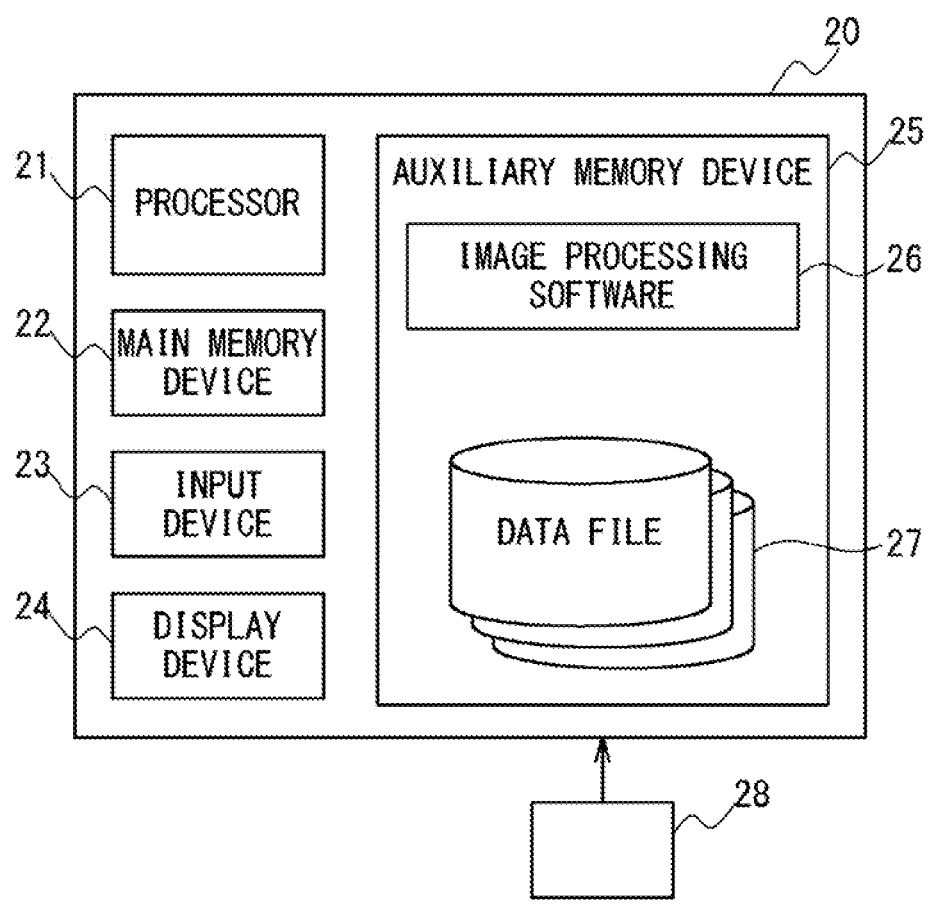
FIG. 7 is a block diagram illustrating the configuration of an image processing apparatus in still another embodiment.

The calculation of the degree of similarity S between images P and Q may be implemented with software. FIG. 7 is a block diagram schematically illustrating one example of the configuration of an image processing apparatus 20 which is configured to calculate the degree of similarity S between images P and Q with software. The image processing apparatus 20, which is configured as a computer, includes a processor 21 (e.g. CPU (central processing unit)), a main memory device 22, an input device 23, a display device 24, an auxiliary memory device 25. The auxiliary memory device 25 stores therein image processing software 26 and data files 27. The image processing software 26 includes program codes used for image processing in the image processing apparatus 20, including the above-described calculation of the degree of similarity S between image P and Q; the above-described calculation of the degree of similarity S between image P and Q is achieved by executing the image processing software 26 with the processor 21. Stored in the data files 27 are image data to be subjected to the image processing in the image processing apparatus 20 (e.g. image data of images P and Q), data used in the image processing, and data obtained as the result of the image processing. Installation of the image processing software 26 into the image processing apparatus 20 may be achieved by using a non-transitory recording medium 28 storing the image processing software 26, for example.

In one embodiment, image data of images P and Q are stored in a data file 27, and the image processing software 26 calculates the degree of similarity S between images P and Q by performing the above-described processing on the image data of images P and Q. When the image data of images P and Q are given in a format different than the RGB format, processing to convert the image data into the RGB format may be performed and followed by calculating the degree of similarity S from the image data obtained by this conversion.

The above-described calculation scheme of the degree of similarity between images in this embodiment may be used in various image processing techniques. For example, the above-described calculation scheme may be used for selecting a suitable one from a plurality of compression processes. FIG. 8 is a block diagram illustrating one example of the configuration of an image compression circuit 30 configured to perform such operation.

The image compression circuit 30 illustrated in FIG. 8 is configured to perform a compression process on an image data $D_{IN}$ in the RGB format and output an output compressed image data $D_{OUT}$. The image compression circuit 30 includes compression blocks $31_1$ to $31_3$, decompression blocks $32_1$ to $32_3$, RGB grayscale data conversion circuits $33_1$ to $33_3$, 34 and a compressed image data selection circuit 35.

The compression blocks $31_1$ to $31_3$ form a compression circuitry which generates compressed data #1 to #3 by performing first to third compression processes on the image data $D_{IN}$, respectively. More specifically, the compression block $31_1$ performs a first compression process (compression process #1) on the image data $D_{IN}$ to generate compressed data #1. Similarly, the compression block $31_2$ performs a second compression process (compression process #2) on the image data $D_{IN}$ to generate compressed data #2 and the compression block $31_3$ performs a third compression process (compression process #3) on the image data $D_{IN}$ to generate compressed data #3.

The decompression blocks $32_1$ to $32_3$ form a decompression circuitry which performs corresponding decompression processes on the compressed data #1 to #3 to generate decompressed data #1 to #3. More specifically, the decompression block $32_1$ performs the decompression process corresponding to compression process #1 (decompression process #1) on compressed data #1 to generate decompressed data #1. The decompressed data #1 obtained through decompressed process #1 is in the RGB format, as is the case with the image data $D_{IN}$. Similarly, the decompression block $32_2$ performs the decompression process corresponding to compression process #2 (decompression process #2) on compressed data #2 to generate decompressed data #2, and the decompression block $32_3$ performs the decompression process corresponding to compression process #3 (decompression process #3) on compressed data #3 to generate decompressed data #3. Decompressed data #2 and #3 obtained through decompression processes #2 and #3 are in the RGB format, as is the case with the image data $D_{IN}$.

The RGB grayscale data conversion circuits $33_1$ to $33_3$ are configured similarly to the above-described RGB grayscale data conversion circuits 11 and 12 (see FIG. 5), and have a similar function. The RGB grayscale data conversion circuit $33_1$ calculates values $f(R_{1i})$, $f(G_{1i})$ and $f(B_{1i})$ by respectively applying the function f(x) to the R grayscale value $R_{1i}$, the G grayscale value $G_{1i}$ and the B grayscale value $B_{1i}$ of each pixel i of decompressed data #1. Similarly, the RGB grayscale data conversion circuit $33_2$ calculates values $f(R_{2i})$, $f(G_{2i})$ and $f(B_{2i})$ by respectively applying the function f(x) to the R grayscale value $R_{2i}$, the G grayscale value $G_{2i}$ and the B grayscale value $B_{2i}$ of each pixel i of decompressed data #2. Furthermore, the RGB grayscale data conversion circuit $33_3$ calculates values $f(R_{3i})$, $f(G_{3i})$ and $f(B_{3i})$ by respectively applying the function f(x) to the R grayscale value $R_{3i}$, the G grayscale value $G_{3i}$ and the B grayscale value $B_{3i}$ of each pixel i of decompressed data #3.

The RGB grayscale data conversion circuits 34 is also configured similarly to the above-described RGB grayscale data conversion circuits 11 and 12, and has a similar function. The RGB grayscale data conversion circuits 34 calculates values $f(R_{INi})$, $f(G_{INi})$ and $f(B_{INi})$ by respectively applying the function $f(x)$ to the R grayscale value $R_{INi}$, the G grayscale value $G_{INi}$ and the B grayscale value $B_{INi}$ of each pixel i of the original image data $D_{IN}$.

The compressed image data selection circuit 35 calculates the degree of similarity $S_1$ between decompressed data #1 and the original image data $D_{IN}$, the degree of similarity $S_2$ between decompressed data #2 and the original image data $D_{IN}$ and the degree of similarity $S_3$ between decompressed data #3 and the original image data $D_{IN}$ and outputs a selected one of compressed data #1 to #3 as an output compressed image data $D_{OUT}$, on the basis of the degrees of similarity $S_1$ to $S_3$.

More specifically, in one embodiment, the degree of similarity $S_1$ between decompressed data #1 and the original image data $D_{IN}$ is calculated by applying a selected one of expressions (4) to (9) to decompressed data #1 and the original image data $D_{IN}$ as the image data of images P and Q, respectively. Similarly, the degree of similarity $S_2$ between decompressed data #2 and the original image data $D_{IN}$ is calculated by applying the selected one of expressions (4) to (9) to decompressed data #2 and the original image data $D_{IN}$ as the image data of images P and Q, respectively. Also, the degree of similarity $S_3$ between decompressed data #3 and the original image data $D_{IN}$ is calculated by applying the selected one of expressions (4) to (9) to decompressed data #3 and the original image data $D_{IN}$ as the image data of images P and Q, respectively.

In other words, the degree of similarity $S_k$ between decompressed data #k and the original image data $D_{IN}$ may be calculated in accordance with a selected one of the following expressions (10) to (15) for k being an integer from one to three:

$$S_k = \sum_i g(|f(R_{ki}) - f(R_{INi})|, |f(G_{ki}) - f(G_{INi})|, |f(B_{ki}) - f(B_{INi})|), \quad (10)$$

$$S_k = \sum_i \{K_R |f(R_{ki}) - f(R_{INi})|^p + K_G |f(G_{ki}) - f(G_{INi})|^p + K_B |f(B_{ki}) - f(B_{INi})|^p\}, \quad (11)$$

$$S_k = \sum_i \{|f(R_{ki}) - f(R_{INi})|^p + |f(G_{ki}) - f(G_{INi})|^p + |f(B_{ki}) - f(B_{INi})|^p\}, \quad (12)$$

$$S_k = \sum_i \{K_R |f(R_{ki}) - f(R_{INi})| + K_G |f(G_{ki}) - f(G_{INi})| + K_B |f(B_{ki}) - f(B_{INi})|\}, \quad (13)$$

$$S_k = \sum_i \{K_R |R_{ki}^\gamma - R_{INi}^\gamma| + K_G |G_{ki}^\gamma - G_{INi}^\gamma| + K_B |B_{ki}^\gamma - B_{INi}^\gamma|\}, \quad (14)$$

and $$S_k = \sum_i \{K_R |R_{ki}^{2.2} - R_{INi}^{2.2}| + K_G |G_{ki}^{2.2} - G_{INi}^{2.2}| + K_B |B_{ki}^{2.2} - B_{INi}^{2.2}|\} \quad (15)$$

Also with respect to the function $f(x)$ included in expressions (10) to (13), it is preferable to use a polygonal line function or polynomial function which approximates a constant power of x, as the function $f(x)$. Especially, when the gamma value of the display device is $\gamma$, it is preferable to use a polygonal line function or polynomial function which approximates $x^\gamma$ as the function $f(x)$.

The coefficients and/or constants of the function $f(x)$ used in the RGB grayscale data conversion circuits $33_1$ to $33_3$ and 34 may be specified by setting parameters stored in the setting registers 36. In this case, the function $f(x)$ can be modified by modifying the setting parameters stored in the setting registers 36. For example, when the function $f(x)$ is defined by the following expression:

$$f(x) = x^\gamma,$$

a setting parameter specifying $\gamma$ may be stored in the setting register 36. In an alternative embodiment, when the function $f(x)$ is defined as a polygonal line function, setting parameters specifying coefficients of expressions defining the respective line segments that form the graph of the polygonal line function may be stored in the setting registers 36. In another alternative embodiment, when the function $f(x)$ is defined as a polynomial function of x, setting parameters specifying coefficients of respective terms of the polynomial expression may be stored in the setting registers 36.

The coefficients and/or constants of the function $g(x, y, z)$ used for the calculation of the degree of similarity $S_k$ in the compressed image data selection circuit 35 for k being an integer from one to three may be specified by setting parameters stored in the setting register 37. In this case, the function $g(x, y, z)$ can be modified by modifying the setting parameters stored in the setting register 37. When the degree of similarity $S_k$ is calculated in accordance with a selected one of expressions (11), (13), (14) and (15), for example, the setting register 37 may store the weighting factors $K_R$, $K_G$ and $K_B$. In this case, the degree of similarity $S_k$ is calculated with the weighting factors $K_R$, $K_G$ and $K_B$ stored in the setting register 37.

The image compression circuit 30 thus configured can output the output compressed image data $D_{OUT}$ so that the output compressed image data $D_{OUT}$ is generated through a suitable one of a plurality of compression processes (three compression processes #1 to #3 in the configuration illustrated in FIG. 8), more specifically, the compression process which causes the least compression distortion. When the degrees of similarity $S_1$ to $S_3$ are defined as meaning to be more similar as the values of the degrees of similarity $S_1$ to $S_3$ are reduced, the compressed data corresponding to one having the least value out of the degrees of similarity $S_1$ to $S_3$ is selected as the output compressed image data $D_{OUT}$. This allows outputting the compressed data generated through the compression process that causes the least compression distortion as the output compressed image data $D_{OUT}$. In the present embodiment, in which the degrees of similarity $S_1$ to $S_3$ are calculated in view of the input-output property of the display device, it is possible to output the compressed data generated through the compression process which causes the least compression distortion in the image actually displayed on the display device, as the output compressed image data $D_{OUT}$.

Figure 9A:
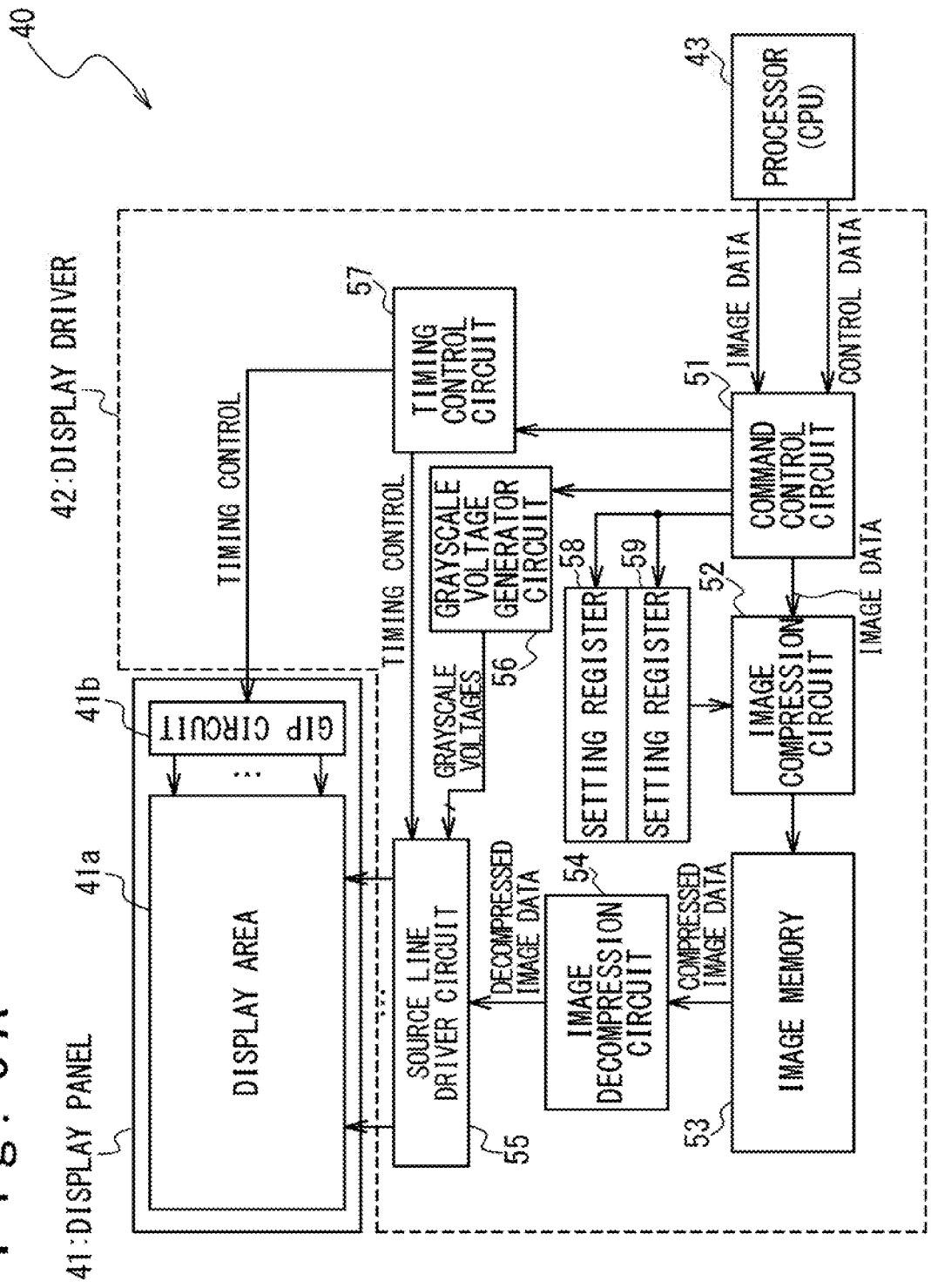
FIG. 9A is a block diagram illustrating one example of the configuration of a display device including a display driver incorporating the image compression circuit illustrated in FIG. 8.

The image compression circuit 30 illustrated in FIG. 8 may be used for performing compression processing on image data in a display driver which drives a display panel. FIG. 9A is a block diagram illustrating an exemplary configuration of a display device 40 including a display driver thus configured. The display device 40 includes a display panel 41 (e.g. a liquid crystal display panel and an OLED display panel) and a display driver 42. The display panel 41 includes a display area 41a and a GIP (gate in panel) circuit 41b. Disposed in the display area 41a are pixels, gate lines and source lines. The GIP circuit 41b drives the gate lines disposed in the display area 41a. The display driver 42 drives the source lines of the display panel 41 in response to image data and control data received from a processor 43 and also controls the GIP circuit 41b.

The display driver 42 includes a command control circuit 51, an image compression circuit 52, an image memory 53, an image decompression circuit 54, a source line driver circuit 55, a grayscale voltage generator circuit 56, a timing control circuit 57 and setting registers 58 and 59.

The command control circuit 51 forwards the image data received from the processor 43 to the image compression circuit 52. Furthermore, the command control circuit 51 controls the respective circuits of the display driver 42, including the grayscale voltage generator circuit 56 and the timing control circuit 57, in response to the control data received from the processor 43.

The image compression circuit 52 generates compressed image data by performing compression processing on the image data received from the command control circuit 51 and supplies the compressed image data to the image memory 53. In the display device 40 illustrated in FIG. 9A, the image compression circuit 30 illustrated in FIG. 8 is used as the image compression circuit 52.

The image memory 53 temporarily stores the compressed image data received from the image compression circuit 52. The compressed image data is read out from the image memory 53 and supplied to the image decompression circuit 54.

The image decompression circuit 54 generates a decompressed image data by performing decompression processing on the compressed image data read out from the image memory 53 and supplies the decompressed image data to the source line driver circuit 55.

The source line driver circuit 55 drives the source lines of the display area 41a of the display panel 41 in response to the decompressed image data. In detail, the source line driver circuit 55 generates source voltages having voltage levels corresponding to the decompressed image data by using a set of grayscale voltages received from the grayscale voltage generator circuit 56 and drives the respective source lines with the generated source voltages.

The grayscale voltage generator circuit 56 generates the grayscale voltages used for the generation of the source voltages and supplies the grayscale voltages to the source line driver circuit 55.

The timing control circuit 57 controls the operation timing of the respective circuits of the display driver 42 and the GIP circuit 41b of the display panel 41.

The setting register 58 stores therein setting parameters specifying the coefficients and/or constants of the function f(x) used in the image compression circuit 52. In such configuration, the function f(x) can be modified by modifying the setting parameters stored in the setting register 58. For example, when the function f(x) is defined by the following expression:

$$f(x) = x^\gamma,$$

(e.g., when the degree of similarity is calculated in the image compression circuit 52 in accordance with expression (8)), a setting parameter specifying the value of $\gamma$ may be stored in the setting register 58. In this case, it is preferable that $\gamma$ is equal to the gamma value of the display device 40 or the gamma value of the display panel 41.

When the gamma value of the display device 40 or the gamma value of the display panel 41 is $\gamma$, it is preferable to define the function f(x) as a polygonal line function or polynomial function which approximates $x^\gamma$. In one embodiment, when the function f(x) is defined as a polygonal line function, setting parameters specifying the coefficients of expressions defining the respective line segments that form the graph of the polygonal line function may be stored in the setting register 58. In another embodiment, when the function f(x) is defined as a polynomial expression of x, setting parameters specifying the coefficients of the respective terms of the polynomial expression may be stored in the setting register 58.

The setting register 59 stores therein setting parameters specifying coefficients and/or constants included in the function g(x, y, z) used in the image compression circuit 52. The function g(x, y, z) may be modified by modifying the setting parameters stored in the setting register 59. When the degree of similarity $S_k$ is calculated in the image compression circuit 52 in accordance with a selected one of expressions (11), (13), (14) and (15), for example, the setting register 59 may store therein the weighting factors $K_R$, $K_G$ and $K_B$. In this case, the degree of similarity $S_k$ is calculated by using the weighting factors $K_R$, $K_G$ and $K_B$ stored in the setting register 59.

In the present embodiment, a compressed image data is generated by compressing an image data received from the processor 43 and the image compression circuit 30 illustrated in the FIG. 8 is used as the image compression circuit 52, which supplies the compressed image data to the image memory 53. This allows generating a compressed image data generated by a compression process which causes a reduced compression distortion in the image actually displayed on the display panel 41.

Figure 9B:
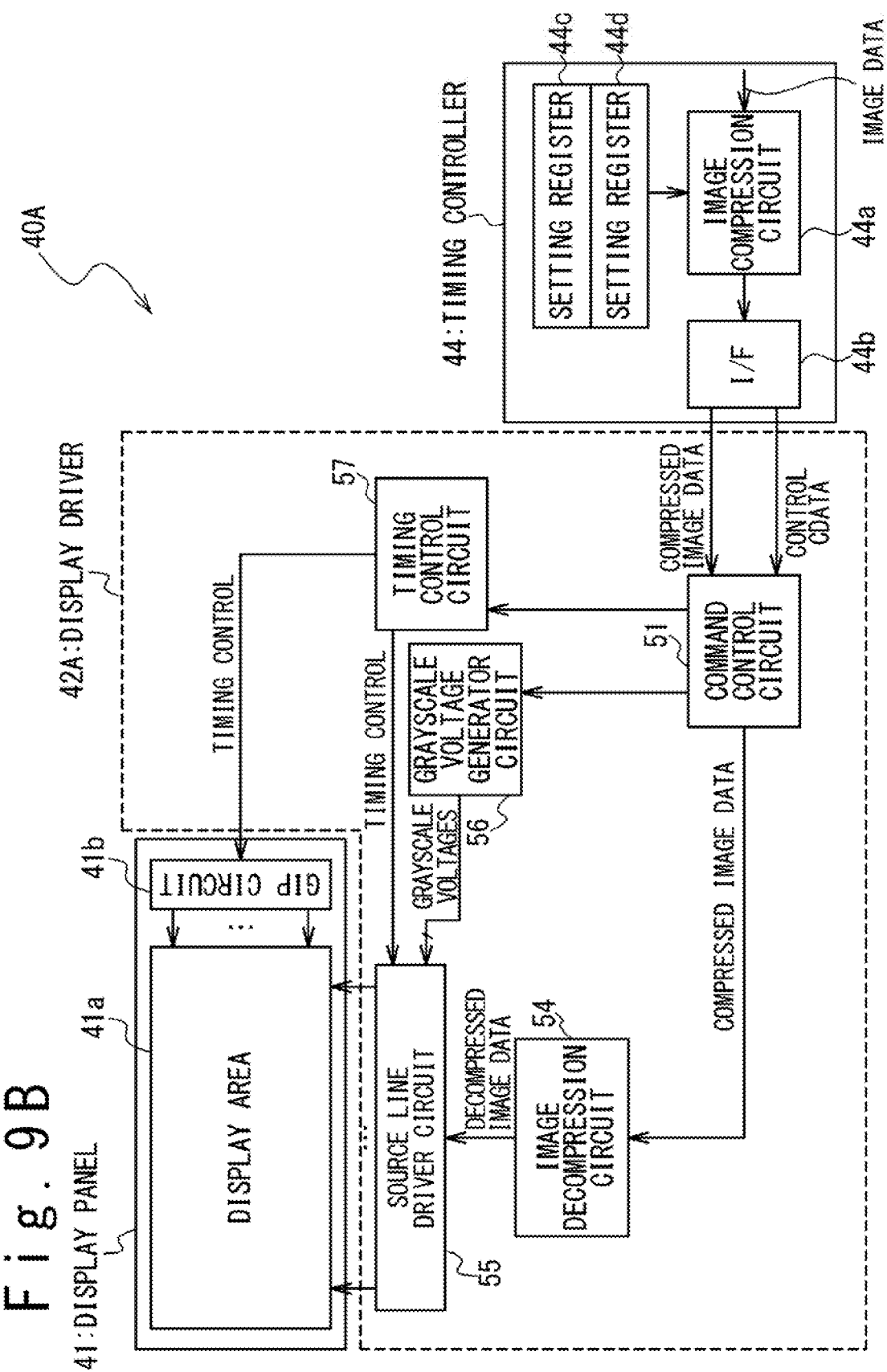
FIG. 9B is a block diagram illustrating one example of the configuration of a display device including a timing controller incorporating the image compression circuit illustrated in FIG. 8.

The image compression circuit 30 illustrated in FIG. 8 may be integrated in a timing controller which supplies image data to a display driver. FIG. 9B is a block diagram illustrating an exemplary configuration of a display device 40A including a timing controller thus configured. The display device 40A includes a display panel 41, a display driver 42A and a timing controller 44.

The timing controller 44 includes an image compression circuit 44a, a communication interface 44b and setting registers 44c and 44d. The image compression circuit 44a receives an image data associated with an image to be displayed on the display panel 41 and generates a compressed image data by compressing the received image data. In the display device 40A illustrated in FIG. 9B, the image compression circuit 30 illustrated in FIG. 8 is used as the image compression circuit 44a. The communication interface 44b transmits the compressed image data generated by the image compression circuit 44a to the display driver 42A and also transmits control data controlling the operation of the display driver 42A to the display driver 42A.

The setting register 44c stores therein setting parameters specifying the coefficients and/or constants of the function f(x) used in the image compression circuit 44a. In such configuration, the function f(x) can be modified by modifying the setting parameters stored in the setting register 44c. For example, when the function f(x) is defined by the following expression:

$$f(x) = x^\gamma,$$

(e.g., when the degree of similarity is calculated in the image compression circuit 44a in accordance with expression (8)), a setting parameter specifying the value of $\gamma$ may be stored in the setting register 44c. In this case, it is preferable that $\gamma$ is equal to the gamma value of the display device 40A or the gamma value of the display panel 41.

When the gamma value of the display device 40A or the gamma value of the display panel 41 is $\gamma$, it is preferable to define the function f(x) as a polygonal line function or polynomial function which approximates $x^\gamma$. In one embodiment, when the function f(x) is defined as a polygonal line function, setting parameters specifying the coefficients of expressions defining the respective line segments that form the graph of the polygonal line function may be stored in the setting register 44c. In another embodiment, when the function f(x) is defined as a polynomial expression of x, setting parameters specifying the coefficients of the respective terms of the polynomial expression may be stored in the setting register 44c.

The setting register 44d stores therein setting parameters specifying coefficients and/or constants included in the function g(x, y, z) used in the image compression circuit 44a. The function g(x, y, z) may be modified by modifying the setting parameters stored in the setting register 44d. When the degree of similarity $S_k$ is calculated in the image compression circuit 44a in accordance with a selected one of expressions (11), (13), (14) and (15), the setting register 44d may store therein the weighting factors $K_R$, $K_G$ and $K_B$. In this case, the degree of similarity $S_k$ is calculated by using the weighting factors $K_R$, $K_G$ and $K_B$ stored in the setting register 44d.

The display driver 42A includes a command control circuit 51, an image decompression circuit 54, a source line driver circuit 55, a grayscale voltage generator circuit 56 and a timing controller circuit 57. The configuration and operation of the display driver 42A illustrated in FIG. 9B are similar to those of the display driver 42 illustrated in FIG. 9A; the difference is that the display driver 42A illustrated in FIG. 9B does not include the image compression circuit 52 and the image memory 53. The command control circuit 51 forwards the compressed image data received from the timing controller 44 to the image decompression circuit 54. The image decompression circuit 54 generates a decompressed image data by performing decompression processing on the compressed image data received from the command control circuit 51 and supplies the decompressed image data to the source line driver circuit 55.

Figure 10:
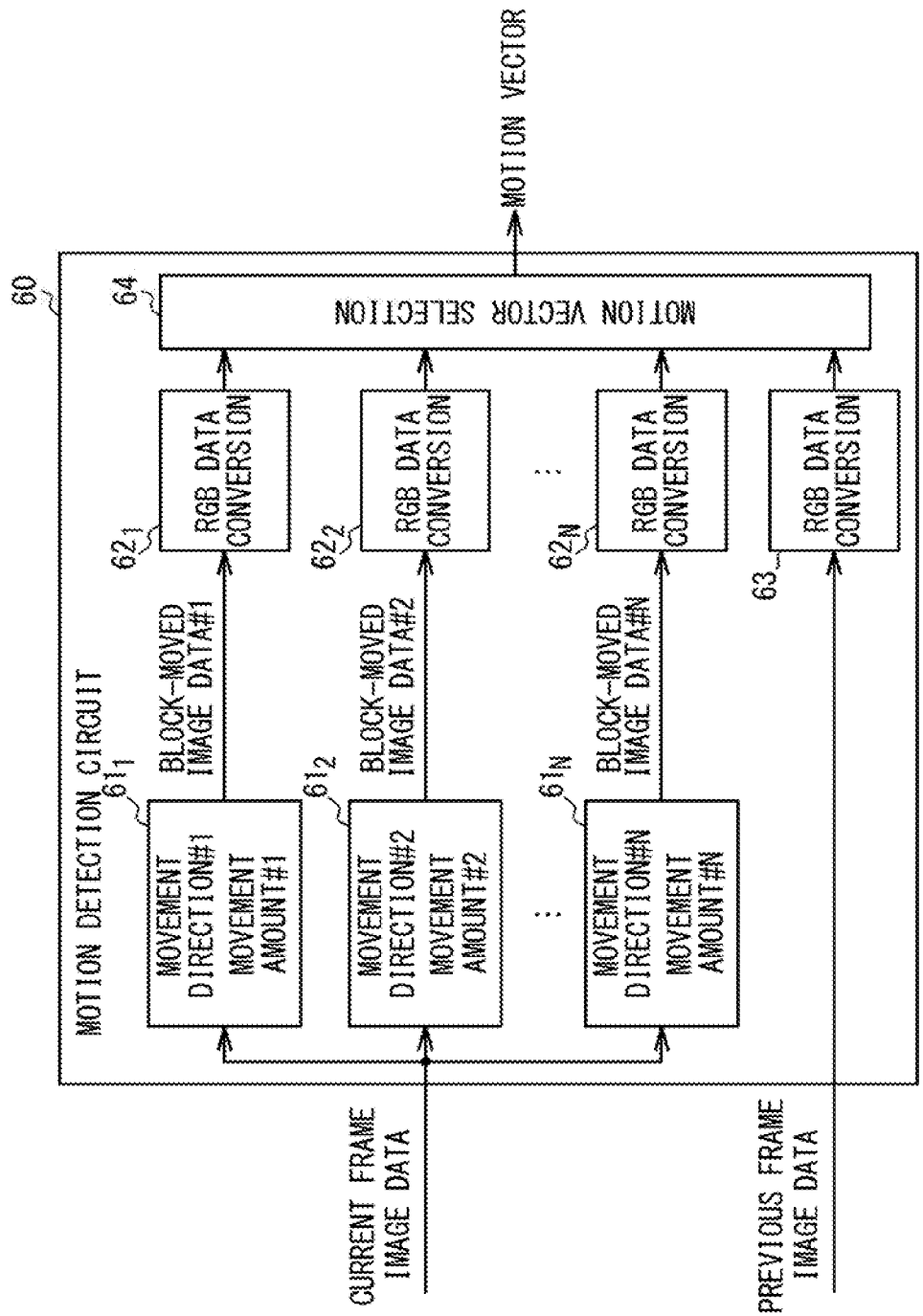
FIG. 10 is a block diagram illustrating the configuration of a motion detection circuit in one embodiment.

In another application example, the above-described calculation scheme of the degree of similarity between images in the present embodiment may be applied to a motion detection circuit which detects a motion vector. FIG. 10 is a block diagram illustrating an exemplary configuration of a motion detection circuit 60 thus configured.

The motion detection circuit 60 illustrated in FIG. 10 is configured to detect a motion vector (that is, the movement direction and movement amount) of a specific block between adjacent frame images. FIG. 11 is a diagram schematically illustrating motion vector detection in the present embodiment. Discussed below is the case when an image element 71 included in a specific block (consisting 16×16 pixels, for example) of the previous frame image is moved in the current frame image as illustrated in FIG. 11. The numeral 72 in FIG. 11 indicates the position at which the image element 71 is positioned in the previous frame image. The motion detection circuit 60 of the present embodiment calculates the motion vector of the block including the image element 71.

More specifically, as illustrated in FIG. 10, the motion detection circuit 60 includes movement generation blocks $61_1$ to $61_N$, RGB grayscale data conversion circuit $62_1$ to $62_N$, 63 and a motion vector selection circuit 64. The movement generation blocks $61_1$ to $61_N$ each receive the current frame image data (image data of the current frame) and generate a block-moved image data which is an image data corresponding to the image in which the specific block is moved in a specific movement direction with a specific movement amount in the current frame image. The motion generation blocks $61_k$ generates block-moved image data # k which is an image data corresponding to the image in which the specific block is moved in movement direction # k with specific movement amount # k in the current frame image, for k being an integer from one to N. FIG. 12 illustrates an example of the definition of movement directions #1 to # N and movement amount #1 to # N. In FIG. 12, movement directions #1 to #8 and movement amount #1 to #8 are illustrated.

The RGB grayscale data conversion circuits $62_1$ to $62_N$ are configured similarly to the above-described RGB grayscale data conversion circuits 11 and 12 (see FIG. 5) and have a similar function. The RGB grayscale data conversion circuits $62_k$ calculates values $f(R_{ki})$, $f(G_{ki})$ and $f(B_{ki})$ by respectively applying the function f(x) to the R grayscale value $R_{ki}$, the G grayscale value $G_{ki}$ and the B grayscale value $B_{ki}$ of each pixel i of block-moved image data # k, for k being an integer from one to N.

The RGB grayscale data conversion circuits 63 is also configured similarly to the above-described RGB grayscale data conversion circuits 11 and 12 has a similar function. The RGB grayscale data conversion circuits 63 calculates values $f(R_{PREi})$, $f(G_{PREi})$ and $f(B_{PREi})$ by respectively applying the function f(x) to the R grayscale value $R_{PREi}$, the G grayscale value $G_{PREi}$ and the B grayscale value $B_{PREi}$ of the image data of each pixel i of the previous frame image.

The motion vector selection circuit 64 calculates the degrees of similarity $S_1$ to $S_N$ between the previous frame image and the images corresponding to the block-moved image data #1 to # N, respectively, and selects the motion vector of the specific block on the basis of the degrees of similarity $S_1$ to $S_N$. When the image corresponding to block-moved image data # j is most similar to the previous frame data out of the images corresponding to block-moved image data #1 to # N, the motion vector indicating movement direction # j and movement amount # j used for generating block-moved image data # j is selected. The motion vector of the specific block is thus detected.

The motion detection circuit 60 of the present embodiment, which calculates the degrees of similarity $S_1$ to $S_N$ in view of the input-output property of the display device, can detect the motion vector on the basis of the difference between images actually displayed on the display device. This effectively improves the accuracy of motion prediction.

Another embodiment of the present disclosure may be represented as a display device, comprising: a display panel; an image compression circuit generating an output compressed image data from an original image data; an image decompression circuit generating a decompressed image data by decompressing the output compressed image data received from the compression circuit; a drive circuitry driving the display panel in response to the decompressed image data; and a first setting register. The image compression circuit includes: a compression circuitry generating first to $N^{th}$ compressed data by performing first to $N^{th}$ compression processes on the original image data, respectively, for N being an integer of two or more; a decompression circuitry generating first to $N^{th}$ decompressed data by respectively performing corresponding decompression processes on the first to $N^{th}$ compressed data; first to $(N+1)^{th}$ grayscale data conversion circuits; and a compressed image data selection circuit selecting the output compressed image data from among the first to $N^{th}$ compressed data and outputting the output compressed image data. The $k^{th}$ grayscale data conversion circuit of the first to $N^{th}$ grayscale data conversion circuit is configured to calculate values $f(R_{ki})$, $f(G_{ki})$ and $f(B_{ki})$ by respectively applying a function f(x) to an R grayscale value $R_{ki}$, a G grayscale value $G_{ki}$ and a B grayscale value $B_{ki}$ of each pixel i of the $k^{th}$ decompressed data of the first to N$^{th}$ decompressed data, for k being any integer from one to N. The (N+1)$^{th}$ grayscale data conversion circuit is configured to calculate values f(R$_{INi}$), f(G$_{INi}$) and f(B$_{INi}$) by respectively applying the function f(x) to an R grayscale value R$_{INi}$, a G grayscale value G$_{INi}$ and a B grayscale value B$_{INi}$ of each pixel i of the original image data. The compressed image data select circuit is configured to calculate degrees of similarity between the original image data and the first to N$^{th}$ decompressed data and select an output compressed image data from the first to N$^{th}$ compressed data in response to the calculated degrees of similarity. The degree of similarity between the k$^{th}$ decompressed data and the original image data is calculated depending on |f(R$_{Pi}$)−f(R$_{Qi}$)|, |f(G$_{Pi}$)−f(G$_{Qi}$)| and |f(B$_{Pi}$)−f(B$_{Qi}$)| associated with each pixel i of the k$^{th}$ decompressed data and the original image data. A lower limit of a domain of definition of the function f(x) is the allowed minimum value of the R grayscale values R$_{ki}$, R$_{INi}$, the G grayscale values G$_{ki}$, G$_{INi}$ and the B grayscale values B$_{ki}$, B$_{INi}$, and an upper limit of the domain of definition is the allowed maximum value of the R grayscale values R$_{ki}$, R$_{INi}$, the G grayscale values G$_{ki}$, G$_{INi}$ and the B grayscale values B$_{ki}$, B$_{INi}$. The function f(x) is a convex function monotonically non-decreasing in the domain of definition. The first setting register stores a first setting parameter specifying a coefficient included in the function f(x).

In another embodiment, the display device further comprises a second setting register, wherein the degree of similarity S$_k$ between the k$^{th}$ decompressed data and the original image data is calculated in accordance with the following expression (16):

$$S_k = \sum_i \{K_R |f(R_{ki}) - f(R_{INi})| + K_G |f(G_{ki}) - f(G_{INi})| + K_B |f(B_{ki}) - f(B_{INi})|\}, \quad (16)$$

where K$_R$, K$_G$ and K$_B$ are weighting factors defined for red, green and blue colors, respectively, in calculating the degree of similarity S$_k$. The second setting register stores second setting parameters specifying the weighting factors K$_R$, K$_G$ and K$_B$.

In another embodiment of the display device, the degree of similarity S$_k$ between the k$^{th}$ decompressed data and the original image data is calculated in accordance with the following expression (17):

$$S_k = \sum_i \{K_R |R_{Pi}^\gamma - R_{Qi}^\gamma| + K_G |G_{Pi}^\gamma - G_{Qi}^\gamma| + K_B |B_{Pi}^\gamma - B_{Qi}^\gamma|\}, \quad (17)$$

where K$_R$, K$_G$ and K$_B$ are weighting factors defined for red, green and blue colors, respectively, in calculating the degree of similarity S$_k$, where γ is equal to a gamma value of the display panel or the display device.

Another embodiment of the present disclosure may be represented as an image processing method, comprising calculating values f(R$_{Pi}$), f(G$_{Pi}$) and f(B$_{Pi}$) by applying a function f(x) to an R grayscale value R$_{Pi}$, a G grayscale value G$_{Pi}$ and a B grayscale value B$_{Pi}$ of each pixel i of a first image; calculating values f(R$_{Qi}$), f(G$_{Qi}$) and f(B$_{Qi}$) by applying the function f(x) to an R grayscale value R$_{Qi}$, a G grayscale value G$_{Qi}$ and a B grayscale value B$_{Qi}$ of each pixel i of a second image; and calculating a degree of similarity between the first and second images depending on |f(R$_{Pi}$)−f(R$_{Qi}$)|, |f(G$_{Pi}$)−f(G$_{Qi}$)| and |f(B$_{Pi}$)−f(B$_{Qi}$)| associated with each pixel i of the first and second images. A lower limit of a domain of definition of the function f(x) is the allowed minimum value of the R grayscale values R$_{Pi}$, R$_{Qi}$, the G grayscale values G$_{Pi}$, G$_{Qi}$ and the B grayscale values B$_{Pi}$, B$_{Qi}$, and an upper limit of the domain of definition is the allowed maximum value of the R grayscale values R$_{Pi}$, R$_{Qi}$, the G grayscale values G$_{Pi}$, G$_{Qi}$ and the B grayscale values B$_{Pi}$, B$_{Qi}$. The function f(x) is a convex function monotonically non-decreasing in the domain of definition.

Another embodiment of the present disclosure may be represented as a non-transitory recording medium recording a program which when executed causes a computer to implement steps of: calculating values f(R$_{Pi}$), f(G$_{Pi}$) and f(B$_{Pi}$) by applying a function f(x) to an R grayscale value R$_{Pi}$, a G grayscale value G$_{Pi}$ and a B grayscale value B$_{Pi}$ of each pixel i of a first image; calculating values f(R$_{Qi}$), f(G$_{Qi}$) and f(B$_{Qi}$) by applying the function f(x) to an R grayscale value R$_{Qi}$, a G grayscale value G$_{Qi}$ and a B grayscale value B$_{Qi}$ of each pixel i of a second image; and calculating a degree of similarity between the first and second images depending on |f(R$_{Pi}$)−f(R$_{Qi}$)|, |f(G$_{Pi}$)−f(G$_{Qi}$)| and |f(B$_{Pi}$)−f(B$_{Qi}$)| associated with each pixel i of the first and second images. A lower limit of a domain of definition of the function f(x) is the allowed minimum value of the R grayscale values R$_{Pi}$, R$_{Qi}$, the G grayscale values G$_{Pi}$, G$_{Qi}$ and the B grayscale values B$_{Pi}$, B$_{Qi}$, and an upper limit of the domain of definition is the allowed maximum value of the R grayscale values R$_{Pi}$, R$_{Qi}$, the G grayscale values G$_{Pi}$, G$_{Qi}$ and the B grayscale values B$_{Pi}$, B$_{Qi}$. The function f(x) is a convex function monotonically non-decreasing in the domain of definition.

Although various embodiments of the present disclosure have been specifically described in the above, the present disclosure must not be construed as being limited to the above-described embodiments. It would be apparent to a person skilled in the art that the present disclosure may be implemented with various modifications.

What is claimed is:

1. A method comprising:
   for each pixel of a first image and of a second image, applying a convex function to grayscale values for elementary colors of the pixel, wherein the convex function is monotonically non-decreasing in a domain defined between an allowed minimum value and an allowed maximum value of the grayscale values; and
   calculating a degree of similarity between the first image and the second image after application of the convex function, wherein the degree of similarity is based on absolute differences between corresponding pixels of the first image and of the second image for each of the elementary colors.

2. The method of claim 1, further comprising:
   performing, based on the degree of similarity, an image processing operation on image data of the first image.

3. The method of claim 2, wherein performing the image processing operation on the image data of the first image comprises:
   selecting, based on the degree of similarity, a first compression process of a plurality of compression processes; and
   outputting compressed image data that is compressed according to the first compression process.

4. The method of claim 1,
   wherein the elementary colors comprise red (R), green (G), and blue (B) colors, wherein applying the convex function to grayscale values of each pixel of the first image comprises calculating values f($R_{Pi}$), f($G_{Pi}$), and f($B_{Pi}$) by applying a function f(x) to an R grayscale value $R_{Pi}$, a G grayscale value $G_{Pi}$, and a B grayscale value $B_{Pi}$ of each pixel i of the first image, wherein applying the convex function to grayscale values of each pixel of the second image comprises calculating values f($R_{Qi}$), f($G_{Qi}$), and f($B_{Qi}$) by applying the function f(x) to an R grayscale value $R_{Qi}$, a G grayscale value $G_{Qi}$, and a B grayscale value $B_{Qi}$ of each pixel i of the second image, wherein calculating the degree of similarity is based on |f($R_{Pi}$)−f($R_{Qi}$)|, |f($G_{Pi}$)−f($G_{Qi}$)|, and |f($B_{Pi}$)−f($B_{Qi}$)| associated with each pixel i of the first image and the second image, and wherein the allowed minimum value of the grayscale values is the allowed minimum value of the R grayscale values $R_{Pi}$, $R_{Qi}$, the G grayscale values $G_{Pi}$, $G_{Qi}$, and the B grayscale values $B_{Pi}$, $B_{Qi}$, and wherein the allowed maximum value of the grayscale values is the allowed maximum value of the R grayscale values $R_{Pi}$, $R_{Qi}$, the G grayscale values $G_{Pi}$, $G_{Qi}$, and the B grayscale values $B_{Pi}$, $B_{Qi}$.

5. The method of claim 4, wherein the degree of similarity between the first image and the second image is calculated in accordance with the following expression (1):

$$S = \sum_i g(|f(R_{Pi}) - f(R_{Qi})|, |f(G_{Pi}) - f(G_{Qi})|, |f(B_{Pi}) - f(B_{Qi})|), \quad (1)$$

wherein Σ represents a sum with respect to all pixels of the first image, and wherein the second image and g(x, y, z) is a function which is not a constant function.

6. The method of claim 4, wherein the degree of similarity between the first image and the second image is calculated in accordance with the following expression (2):

$$S = \sum_i \{K_R |f(R_{Pi}) - f(R_{Qi})|^p + K_G |f(G_{Pi}) - f(G_{Qi})|^p + K_B |f(B_{Pi}) - f(B_{Qi})|^p\}, \quad (2)$$

wherein p is a non-zero number, and wherein $K_R$, $K_G$ and $K_B$ are weighting factors defined for the R, G, and B colors, respectively, in calculating the degree of similarity S.

7. The method of claim 6, wherein the weighting factors $K_R$, $K_G$ and $K_B$ are determined based on a color gamut of a display panel included in a display device in which image data of the first image and the second image are used.

8. The method of claim 4, wherein the degree of similarity between the first image and the second image is calculated in accordance with the following expression (3):

$$S_k = \sum_i \{K_R |f(R_{Pi}) - f(R_{Qi})| + K_G |f(G_{Pi}) - f(G_{Qi})| + K_B |f(B_{Pi}) - f(B_{Qi})|\}, \quad (3)$$

wherein $K_R$, $K_G$ and $K_B$ are weighting factors defined for the R, G, and B colors, respectively, in calculating the degree of similarity S.

9. The method of claim 4, wherein the degree of similarity between the first image and the second image is calculated in accordance with the following expression (4):

$$S = \sum_i \{K_R |R_{Pi}^\gamma - R_{Qi}^\gamma| + K_G |G_{Pi}^\gamma - G_{Qi}^\gamma| + K_B |B_{Pi}^\gamma - B_{Qi}^\gamma|\}, \quad (4)$$

wherein $K_R$, $K_G$ and $K_B$ are weighting factors defined for the R, G, and B colors, respectively, in calculating the degree of similarity S, and wherein γ is a predetermined constant.

10. The method of claim 4, wherein the function f(x) is defined as a polygonal line function which approximates x^γ, wherein γ is a predetermined constant.

11. The method of claim 10, wherein γ is equal to a gamma value of a display device in which image data of the first image and the second image are used.

12. The method of claim 4, wherein the function f(x) is defined as a polynomial function which approximates x^γ, wherein γ is a predetermined constant.

13. A non-transitory recording medium containing program code that configures a processor to perform an operation comprising:

receiving image data of a first image and of a second image;

for each pixel of the first image and of the second image, applying a convex function to grayscale values for elementary colors of the pixel, wherein the convex function is monotonically non-decreasing in a domain defined between an allowed minimum value and an allowed maximum value of the grayscale values; and calculating a degree of similarity between the first image and the second image after application of the convex function, wherein the degree of similarity is based on absolute differences between corresponding pixels of the first image and of the second image for each of the elementary colors.

14. The non-transitory recording medium of claim 13, wherein the elementary colors comprise red (R), green (G), and blue (B) colors, wherein applying the convex function to grayscale values of each pixel of the first image comprises calculating values f($R_{Pi}$), f($G_{Pi}$), and f($B_{Pi}$) by applying a function f(x) to an R grayscale value $R_{Pi}$, a G grayscale value $G_{Pi}$, and a B grayscale value $B_{Pi}$ of each pixel i of the first image, wherein applying the convex function to grayscale values of each pixel of the second image comprises calculating values f($R_{Qi}$), f($G_{Qi}$), and f($B_{Qi}$) by applying the function f(x) to an R grayscale value $R_{Qi}$, a G grayscale value $G_{Qi}$, and a B grayscale value $B_{Qi}$ of each pixel i of the second image, wherein calculating the degree of similarity is based on |f($R_{Pi}$)−f($R_{Qi}$)|, |f($G_{Pi}$)−f($G_{Qi}$)|, and |f($B_{Pi}$)−f($B_{Qi}$)| associated with each pixel i of the first image and the second image, wherein the allowed minimum value of the grayscale values is the allowed minimum value of the R grayscale values $R_{Pi}$, $R_{Qi}$, the G grayscale values $G_{Pi}$, $G_{Qi}$, and the B grayscale values $B_{Pi}$, $B_{Qi}$, and wherein the allowed maximum value of the grayscale value is the allowed maximum value of the R grayscale values $R_{Pi}$, $R_{Qi}$, the G grayscale values $G_{Pi}$, $G_{Qi}$, and the B grayscale values $B_{Pi}$, $B_{Qi}$.

15. The non-transitory recording medium of claim 14, wherein the degree of similarity between the first image and the second image is calculated in accordance with the following expression (1):

$$S = \sum_i g(|f(R_{Pi}) - f(R_{Qi})|, |f(G_{Pi}) - f(G_{Qi})|, |f(B_{Pi}) - f(B_{Qi})|), \quad (1)$$

wherein Σ represents a sum with respect to all pixels of the first image, and wherein the second image and g(x, y, z) is a function which is not a constant function.

16. The non-transitory recording medium of claim 14, wherein the degree of similarity between the first image and the second image is calculated in accordance with the following expression (2):

$$S = \sum_i \{K_R |f(R_{Pi}) - f(R_{Qi})|^p + K_G |f(G_{Pi}) - f(G_{Qi})|^p + K_B |f(B_{Pi}) - f(B_{Qi})|^p\}, \quad (2)$$

wherein p is a non-zero number, and wherein $K_R$, $K_G$ and $K_B$ are weighting factors defined for the R, G, and B colors, respectively, in calculating the degree of similarity S.

17. The non-transitory recording medium of claim 14, wherein the degree of similarity between the first image and the second image is calculated in accordance with the following expression (3):

$$S = \sum_i \{K_R |f(R_{Pi}) - f(R_{Qi})| + K_G |f(G_{Pi}) - f(G_{Qi})| + K_B |f(B_{Pi}) - f(B_{Qi})|\}, \quad (3)$$

wherein $K_R$, $K_G$ and $K_B$ are weighting factors defined for the R, G, and B colors, respectively, in calculating the degree of similarity S.

18. The non-transitory recording medium of claim 14, wherein the degree of similarity between the first image and the second image is calculated in accordance with the following expression (4):

$$S = \sum_i \{K_R |R_{Pi}^\gamma - R_{Qi}^\gamma| + K_G |G_{Pi}^\gamma - G_{Qi}^\gamma| + K_B |B_{Pi}^\gamma - B_{Qi}^\gamma|\}, \quad (4)$$

wherein $K_R$, $K_G$ and $K_B$ are weighting factors defined for the R, G, and B colors, respectively, in calculating the degree of similarity S, and wherein γ is a predetermined constant.

19. A display device, comprising:
a display panel;
an image compression circuit configured to generate an output compressed image data from an original image data, wherein the image compression circuit comprises:
a compression circuitry configured to generate first to $N^{th}$ compressed data by performing first to $N^{th}$ compression processes on the original image data, respectively, for N being an integer of two or more;
a decompression circuitry configured to generate first to $N^{th}$ decompressed data by respectively performing corresponding decompression processes on the first to $N^{th}$ compressed data;
first to $(N+1)^{th}$ grayscale data conversion circuits, wherein:
a $k^{th}$ grayscale data conversion circuit of the first to $N^{th}$ grayscale data conversion circuit is configured to calculate values $f(R_{ki})$, $f(G_{ki})$, and $f(B_{ki})$ by respectively applying a function f(x) to a red (R) grayscale value $R_{ki}$, a green (G) grayscale value $G_{ki}$, and a blue (B) grayscale value $B_{ki}$ of each pixel i of a $k^{th}$ decompressed data of the first to $N^{th}$ decompressed data, for k being any integer from one to N; and
a $(N+1)^{th}$ grayscale data conversion circuit is configured to calculate values $f(R_{INi})$, $f(G_{INi})$, and $f(B_{INi})$ by respectively applying the function f(x) to an R grayscale value $R_{INi}$, a G grayscale value $G_{INi}$, and a B grayscale value $B_{INi}$ of each pixel i of the original image data; and
a compressed image data selection circuit configured to select the output compressed image data from among the first to $N^{th}$ compressed data, and to output the output compressed image data;
a compressed image data select circuit configured to:
calculate degrees of similarity between the original image data and the first to $N^{th}$ decompressed data, wherein the degree of similarity between a $k^{th}$ decompressed data and the original image data is calculated depending on $|f(R_{ki})-f(R_{INi})|$, $|f(G_{ki})-f(G_{INi})|$, and $|f(B_{ki})-f(B_{INi})|$ associated with each pixel i of the $k^{th}$ decompressed data and the original image data; and
select an output compressed image data from the first to $N^{th}$ compressed data in response to the calculated degrees of similarity;
an image decompression circuit configured to generate a decompressed image data by decompressing the output compressed image data received from the compression circuit; and
a drive circuitry configured to drive the display panel in response to the decompressed image data,
wherein a lower limit of a domain of definition of the function f(x) is an allowed minimum value of the R grayscale values $R_{ki}$, $R_{INi}$, the G grayscale values $G_{ki}$, $G_{INi}$, and the B grayscale values $B_{ki}$, $B_{INi}$,
wherein an upper limit of the domain of definition is an allowed maximum value of the R grayscale values $R_{ki}$, $R_{INi}$, the G grayscale values $G_{ki}$, $G_{INi}$, and the B grayscale values $B_{ki}$, $B_{INi}$, and
wherein the function f(x) is a convex function monotonically non-decreasing in the domain of definition.

20. The display device of claim 19, further comprising:
a first setting register storing a first setting parameter specifying a coefficient included in the function f(x).

* * * * *

UNITED STATES PATENT AND TRADEMARK OFFICE
CERTIFICATE OF CORRECTION

PATENT NO. : 10,657,412 B2
APPLICATION NO. : 16/355100
DATED : May 19, 2020
INVENTOR(S) : Hirobumi Furihata et al.

It is certified that error appears in the above-identified patent and that said Letters Patent is hereby corrected as shown below:

In the Specification

Column 13, Line 51 (Approx.):

Delete "$S_k = \sum_i \{K_R|R_{ki}\gamma - R_{INi}\gamma| + K_G|G_{ki}\gamma - G_{INi}\gamma| + K_B|B_{ki}\gamma - B_{INi}\gamma|\}.$" and insert -- $S_k = \sum_i \{K_R|R_{ki}^\gamma - R_{INi}^\gamma| + K_G|G_{ki}^\gamma - G_{INi}^\gamma| + K_B|B_{ki}^\gamma - B_{INi}^\gamma|\}$ --, therefor.

Column 13, Line 55 (Approx.):

Delete "$S_k = \sum_i \{K_R|R_{ki}2.2 - R_{INi}2.2| + K_G|G_{ki}2.2 - G_{INi}2.2| + K_B|B_{ki}2.2 - B_{INi}2.2|\}$" and insert -- $S_k = \sum_i \{K_R|R_{ki}^{2.2} - R_{INi}^{2.2}| + K_G|G_{ki}^{2.2} - G_{INi}^{2.2}| + K_B|B_{ki}^{2.2} - B_{INi}^{2.2}|\}$ --, therefor.

Column 19, Line 50:

Delete "$S_k = \sum_i \{K_R|R_{Pi}\gamma - R_{Qi}\gamma| + K_G|G_{Pi}\gamma - G_{Qi}\gamma| + K_B|B_{Pi}\gamma - B_{Qi}\gamma|\}.$" and insert -- $S_k = \sum_i \{K_R|R_{Pi}^\gamma - R_{Qi}^\gamma| + K_G|G_{Pi}^\gamma - G_{Qi}^\gamma| + K_B|B_{Pi}^\gamma - B_{Qi}^\gamma|\}$ --, therefor.

Signed and Sealed this
Sixth Day of October, 2020

Andrei Iancu
*Director of the United States Patent and Trademark Office*

CERTIFICATE OF CORRECTION (continued)
U.S. Pat. No. 10,657,412 B2

In the Claims

Column 22, Line 6 (Approx.):

In Claim 9, delete "$S = \sum_{i}\{K_R|R_{Pi}\gamma - R_{Qi}\gamma| + K_G|G_{Pi}\gamma - G_{Qi}\gamma| + K_B|B_{Pi}\gamma - B_{Qi}\gamma|\},$" and insert -- $S = \sum_{i}\{K_R|R_{Pi}^{\gamma} - R_{Qi}^{\gamma}| + K_G|G_{Pi}^{\gamma} - G_{Qi}^{\gamma}| + K_B|B_{Pi}^{\gamma} - B_{Qi}^{\gamma}|\}$ --, therefor.

Column 23, Line 48 (Approx.):

In Claim 18, delete "$S = \sum_{i}\{K_R|R_{Pi}\gamma - R_{Qi}\gamma| + K_G|G_{Pi}\gamma - G_{Qi}\gamma| + K_B|B_{Pi}\gamma - B_{Qi}\gamma|\},$" and insert -- $S = \sum_{i}\{K_R|R_{Pi}^{\gamma} - R_{Qi}^{\gamma}| + K_G|G_{Pi}^{\gamma} - G_{Qi}^{\gamma}| + K_B|B_{Pi}^{\gamma} - B_{Qi}^{\gamma}|\}$ --, therefor.

Column 24, Line 34-35:
In Claim 19, delete "|f($G_{ki}$)-f($G_{INi}$)," and insert -- |f($G_{ki}$)-f($G_{INi}$)|, --, therefor.